United States Patent
Zagorsek et al.

(10) Patent No.: US 9,916,009 B2
(45) Date of Patent: Mar. 13, 2018

(54) NON-TACTILE INTERFACE SYSTEMS AND METHODS

(71) Applicant: LEAP MOTION, INC., San Francisco, CA (US)

(72) Inventors: Michael Zagorsek, Yountville, CA (US); Avinash Dabir, San Francisco, CA (US); Paul Durdik, Foster City, CA (US); Keith Mertens, Oakland, CA (US)

(73) Assignee: LEAP MOTION, INC., San Francisco, CA (US)

( * ) Notice: Subject to any disclaimer, the term of this patent is extended or adjusted under 35 U.S.C. 154(b) by 0 days.

(21) Appl. No.: 14/262,691

(22) Filed: Apr. 25, 2014

(65) Prior Publication Data

US 2014/0320408 A1   Oct. 30, 2014

Related U.S. Application Data

(60) Provisional application No. 61/816,487, filed on Apr. 26, 2013.

(51) Int. Cl.
*G06F 3/01* (2006.01)
*G06K 9/00* (2006.01)

(52) U.S. Cl.
CPC ......... *G06F 3/017* (2013.01); *G06K 9/00355* (2013.01); *G06K 9/00382* (2013.01)

(58) Field of Classification Search
USPC ....................................................... 345/158
See application file for complete search history.

(56) References Cited

U.S. PATENT DOCUMENTS

| | | | |
|---|---|---|---|
| 4,175,862 | A | 11/1979 | DiMatteo et al. |
| 4,879,659 | A | 11/1989 | Bowlin et al. |
| 5,134,661 | A | 7/1992 | Reinsch |
| 5,282,067 | A | 1/1994 | Liu |
| 5,454,043 | A | 9/1995 | Freeman |
| 5,574,511 | A | 11/1996 | Yang et al. |
| 5,581,276 | A | 12/1996 | Cipolla et al. |

(Continued)

FOREIGN PATENT DOCUMENTS

| | | |
|---|---|---|
| CN | 1984236 A | 6/2007 |
| CN | 201332447 Y | 10/2009 |

(Continued)

OTHER PUBLICATIONS

U.S. Appl. No. 14/516,493—Office Action dated May 9, 2016, 21 pages.

(Continued)

*Primary Examiner* — Alexander Eisen
*Assistant Examiner* — Kebede Teshome
(74) *Attorney, Agent, or Firm* — Haynes Beffel & Wolfeld LLP; Ernest J. Beffel, Jr.; Andrew L. Dunlap

(57) ABSTRACT

Methods and systems for processing an input are disclosed that detect a portion of a hand and/or other detectable object in a region of space monitored by a 3D sensor. The method further includes determining a zone corresponding to the region of space in which the portion of the hand or other detectable object was detected. Also, the method can include determining from the zone a correct way to interpret inputs made by a position, shape or a motion of the portion of the hand or other detectable object.

20 Claims, 15 Drawing Sheets

(56) References Cited

U.S. PATENT DOCUMENTS

| | | |
|---|---|---|
| 5,594,469 A | 1/1997 | Freeman et al. |
| 5,742,263 A | 4/1998 | Wang et al. |
| 5,900,863 A | 5/1999 | Numazaki |
| 6,002,808 A | 12/1999 | Freeman |
| 6,031,661 A | 2/2000 | Tanaami |
| 6,072,494 A | 6/2000 | Nguyen |
| 6,147,678 A | 11/2000 | Kumar et al. |
| 6,154,558 A | 11/2000 | Hsieh |
| 6,181,343 B1 | 1/2001 | Lyons |
| 6,184,926 B1 | 2/2001 | Khosravi et al. |
| 6,195,104 B1 | 2/2001 | Lyons |
| 6,204,852 B1 | 3/2001 | Kumar et al. |
| 6,252,598 B1 | 6/2001 | Segen |
| 6,263,091 B1 | 7/2001 | Jain et al. |
| 6,493,041 B1 | 12/2002 | Hanko et al. |
| 6,498,628 B2 | 12/2002 | Iwamura |
| 6,603,867 B1 | 8/2003 | Sugino et al. |
| 6,629,065 B1 | 9/2003 | Gadh et al. |
| 6,661,918 B1 | 12/2003 | Gordon et al. |
| 6,804,656 B1 | 10/2004 | Rosenfeld et al. |
| 6,819,796 B2 | 11/2004 | Hong et al. |
| 6,901,170 B1* | 5/2005 | Terada ................ G06T 7/0083 382/260 |
| 6,919,880 B2 | 7/2005 | Morrison et al. |
| 6,950,534 B2 | 9/2005 | Cohen et al. |
| 6,993,157 B1 | 1/2006 | Oue et al. |
| 7,215,828 B2 | 5/2007 | Luo |
| 7,259,873 B2 | 8/2007 | Sikora et al. |
| 7,308,112 B2 | 12/2007 | Fujimura et al. |
| 7,340,077 B2 | 3/2008 | Gokturk et al. |
| 7,519,223 B2 | 4/2009 | Dehlin et al. |
| 7,532,206 B2 | 5/2009 | Morrison et al. |
| 7,536,032 B2 | 5/2009 | Bell |
| 7,542,586 B2 | 6/2009 | Johnson |
| 7,598,942 B2 | 10/2009 | Underkoffler et al. |
| 7,606,417 B2 | 10/2009 | Steinberg et al. |
| 7,646,372 B2 | 1/2010 | Marks et al. |
| 7,665,041 B2 | 2/2010 | Wilson et al. |
| 7,692,625 B2 | 4/2010 | Morrison et al. |
| 7,831,932 B2 | 11/2010 | Josephsoon et al. |
| 7,840,031 B2 | 11/2010 | Albertson et al. |
| 7,861,188 B2 | 12/2010 | Josephsoon et al. |
| 7,940,885 B2 | 5/2011 | Stanton et al. |
| 7,948,493 B2 | 5/2011 | Klefenz et al. |
| 7,971,156 B2 | 6/2011 | Albertson et al. |
| 8,064,704 B2 | 11/2011 | Kim et al. |
| 8,085,339 B2 | 12/2011 | Marks |
| 8,086,971 B2 | 12/2011 | Radivojevic et al. |
| 8,111,239 B2 | 2/2012 | Pryor et al. |
| 8,112,719 B2 | 2/2012 | Hsu et al. |
| 8,213,707 B2 | 7/2012 | Li et al. |
| 8,235,529 B1 | 8/2012 | Raffle et al. |
| 8,244,233 B2 | 8/2012 | Chang et al. |
| 8,514,221 B2 | 8/2013 | King et al. |
| 8,638,989 B2 | 1/2014 | Holz |
| 8,693,731 B2 | 4/2014 | Holz et al. |
| 8,930,852 B2 | 1/2015 | Chen et al. |
| 9,056,396 B1 | 6/2015 | Linnell |
| 9,182,812 B2 | 11/2015 | Ybanez Zepeda |
| 9,389,779 B2 | 7/2016 | Anderson et al. |
| 9,459,697 B2 | 10/2016 | Bedikian et al. |
| 9,501,152 B2 | 11/2016 | Bedikian et al. |
| 2002/0008211 A1 | 1/2002 | Kask |
| 2002/0021287 A1 | 2/2002 | Tomasi et al. |
| 2002/0041327 A1 | 4/2002 | Hildreth et al. |
| 2002/0105484 A1 | 8/2002 | Navab et al. |
| 2003/0053658 A1 | 3/2003 | Pavlidis |
| 2003/0053659 A1 | 3/2003 | Pavlidis et al. |
| 2003/0081141 A1* | 5/2003 | Mazzapica ......... H04N 1/40093 348/362 |
| 2003/0123703 A1 | 7/2003 | Pavlidis et al. |
| 2003/0152289 A1 | 8/2003 | Luo |
| 2003/0202697 A1 | 10/2003 | Simard et al. |
| 2004/0125228 A1 | 7/2004 | Dougherty |
| 2004/0145809 A1 | 7/2004 | Brenner |
| 2004/0212725 A1 | 10/2004 | Raskar |
| 2005/0131607 A1 | 6/2005 | Breed |
| 2005/0168578 A1 | 8/2005 | Gobush |
| 2005/0236558 A1 | 10/2005 | Nabeshima et al. |
| 2006/0017807 A1 | 1/2006 | Lee et al. |
| 2006/0072105 A1 | 4/2006 | Wagner |
| 2006/0210112 A1 | 9/2006 | Cohen et al. |
| 2006/0290950 A1 | 12/2006 | Platt et al. |
| 2007/0042346 A1 | 2/2007 | Weller |
| 2007/0130547 A1 | 6/2007 | Boillot |
| 2007/0206719 A1 | 9/2007 | Suryanarayanan et al. |
| 2007/0211023 A1* | 9/2007 | Boillot .................... G06F 3/017 345/156 |
| 2007/0238956 A1 | 10/2007 | Haras et al. |
| 2008/0056752 A1 | 3/2008 | Denton et al. |
| 2008/0064954 A1 | 3/2008 | Adams et al. |
| 2008/0106746 A1 | 5/2008 | Shpunt et al. |
| 2008/0111710 A1 | 5/2008 | Boillot |
| 2008/0273764 A1 | 11/2008 | Scholl |
| 2008/0278589 A1 | 11/2008 | Thorn |
| 2008/0304740 A1 | 12/2008 | Sun et al. |
| 2008/0319356 A1 | 12/2008 | Cain et al. |
| 2009/0102840 A1 | 4/2009 | Li |
| 2009/0103780 A1 | 4/2009 | Nishihara et al. |
| 2009/0122146 A1 | 5/2009 | Zalewski et al. |
| 2009/0217211 A1 | 8/2009 | Hildreth et al. |
| 2009/0257623 A1 | 10/2009 | Tang et al. |
| 2009/0274339 A9 | 11/2009 | Cohen et al. |
| 2009/0309710 A1 | 12/2009 | Kakinami |
| 2010/0023015 A1 | 1/2010 | Park |
| 2010/0027845 A1 | 2/2010 | Kim et al. |
| 2010/0046842 A1 | 2/2010 | Conwell |
| 2010/0053164 A1 | 3/2010 | Imai et al. |
| 2010/0058252 A1 | 3/2010 | Ko |
| 2010/0095206 A1 | 4/2010 | Kim |
| 2010/0118123 A1 | 5/2010 | Freedman et al. |
| 2010/0125815 A1 | 5/2010 | Wang et al. |
| 2010/0158372 A1 | 6/2010 | Kim et al. |
| 2010/0199221 A1 | 8/2010 | Yeung et al. |
| 2010/0201880 A1 | 8/2010 | Iwamura |
| 2010/0219934 A1 | 9/2010 | Matsumoto |
| 2010/0222102 A1 | 9/2010 | Rodriguez |
| 2010/0275159 A1 | 10/2010 | Matsubara et al. |
| 2010/0277411 A1 | 11/2010 | Yee et al. |
| 2010/0296698 A1 | 11/2010 | Lien et al. |
| 2010/0302357 A1 | 12/2010 | Hsu et al. |
| 2010/0306712 A1 | 12/2010 | Snook et al. |
| 2010/0309097 A1 | 12/2010 | Raviv et al. |
| 2011/0007072 A1 | 1/2011 | Khan et al. |
| 2011/0026765 A1 | 2/2011 | Ivanich et al. |
| 2011/0057875 A1 | 3/2011 | Shigeta et al. |
| 2011/0066984 A1 | 3/2011 | Li |
| 2011/0080470 A1 | 4/2011 | Kuno et al. |
| 2011/0093820 A1 | 4/2011 | Zhang et al. |
| 2011/0107216 A1 | 5/2011 | Bi |
| 2011/0115486 A1 | 5/2011 | Frohlich et al. |
| 2011/0119640 A1* | 5/2011 | Berkes .................... G06F 3/011 715/863 |
| 2011/0134112 A1 | 6/2011 | Koh et al. |
| 2011/0148875 A1 | 6/2011 | Kim et al. |
| 2011/0169726 A1 | 7/2011 | Holmdahl et al. |
| 2011/0173574 A1 | 7/2011 | Clavin et al. |
| 2011/0181509 A1 | 7/2011 | Rautiainen et al. |
| 2011/0205151 A1 | 8/2011 | Newton et al. |
| 2011/0213664 A1 | 9/2011 | Osterhout et al. |
| 2011/0228978 A1 | 9/2011 | Chen et al. |
| 2011/0234840 A1 | 9/2011 | Klefenz et al. |
| 2011/0251896 A1* | 10/2011 | Impollonia ............ G06Q 30/02 705/14.55 |
| 2011/0267259 A1 | 11/2011 | Tidemand et al. |
| 2011/0286676 A1 | 11/2011 | El Dokor |
| 2011/0289455 A1 | 11/2011 | Reville et al. |
| 2011/0289456 A1 | 11/2011 | Reville et al. |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304650 A1 | 12/2011 | Campillo et al. |
| 2011/0310007 A1 | 12/2011 | Margolis et al. |

(56) References Cited

U.S. PATENT DOCUMENTS

| | | |
|---|---|---|
| 2012/0038637 A1 | 2/2012 | Marks |
| 2012/0050157 A1 | 3/2012 | Latta et al. |
| 2012/0065499 A1 | 3/2012 | Chono |
| 2012/0068914 A1 | 3/2012 | Jacobsen et al. |
| 2012/0204133 A1 | 8/2012 | Guendelman et al. |
| 2012/0250936 A1 | 10/2012 | Holmgren |
| 2012/0320080 A1 | 12/2012 | Giese et al. |
| 2013/0033483 A1 | 2/2013 | Im et al. |
| 2013/0191911 A1 | 7/2013 | Dellinger et al. |
| 2013/0222233 A1 | 8/2013 | Park et al. |
| 2013/0222640 A1 | 8/2013 | Baek et al. |
| 2013/0239059 A1 | 9/2013 | Chen et al. |
| 2013/0257736 A1 | 10/2013 | Hou et al. |
| 2013/0283213 A1 | 10/2013 | Guendelman et al. |
| 2013/0307935 A1 | 11/2013 | Rappel et al. |
| 2013/0321265 A1 | 12/2013 | Bychkov et al. |
| 2014/0055385 A1 | 2/2014 | Duheille |
| 2014/0063060 A1 | 3/2014 | Maciocci et al. |
| 2014/0125813 A1* | 5/2014 | Holz ............... G06K 9/00375 348/169 |
| 2014/0134733 A1 | 5/2014 | Wu et al. |
| 2014/0139641 A1 | 5/2014 | Holz |
| 2014/0157135 A1 | 6/2014 | Lee et al. |
| 2014/0177913 A1 | 6/2014 | Holz |
| 2014/0201666 A1 | 7/2014 | Bedikian et al. |
| 2014/0201689 A1 | 7/2014 | Bedikian et al. |
| 2014/0223385 A1* | 8/2014 | Ton ..................... G06F 3/0488 715/863 |
| 2014/0240215 A1* | 8/2014 | Tremblay ............... G06F 3/01 345/156 |
| 2014/0307920 A1 | 10/2014 | Holz |
| 2014/0344762 A1 | 11/2014 | Grasset et al. |
| 2014/0369558 A1 | 12/2014 | Holz |
| 2015/0003673 A1 | 1/2015 | Fletcher |
| 2015/0084864 A1 | 3/2015 | Geiss et al. |
| 2015/0103004 A1 | 4/2015 | Cohen et al. |
| 2015/0227795 A1* | 8/2015 | Starner .............. G06K 9/00671 345/156 |
| 2015/0293597 A1 | 10/2015 | Mishra et al. |
| 2015/0363070 A1 | 12/2015 | Katz |

FOREIGN PATENT DOCUMENTS

| | | |
|---|---|---|
| CN | 101729808 A | 6/2010 |
| CN | 101930610 A | 12/2010 |
| CN | 101951474 A | 1/2011 |
| CN | 102053702 A | 5/2011 |
| CN | 201859393 U | 6/2011 |
| CN | 102201121 A | 9/2011 |
| CN | 102236412 A | 11/2011 |
| DE | 4201934 A1 | 7/1993 |
| DE | 102007015495 A1 | 10/2007 |
| EP | 0999542 A1 | 5/2000 |
| EP | 1837665 A2 | 9/2007 |
| JP | 2006019526 A | 1/2006 |
| JP | 2009031939 A | 2/2009 |
| JP | 2009037594 A | 2/2009 |
| JP | 2011065652 A | 5/2011 |
| JP | 4906960 B2 | 3/2012 |
| KR | 101092909 B1 | 6/2011 |
| RU | 2422878 C1 | 6/2011 |
| TW | 200844871 A | 11/2008 |
| WO | 1994026057 A1 | 11/1994 |
| WO | 2004114220 A1 | 12/2004 |
| WO | 2006020846 A2 | 2/2006 |
| WO | 2007137093 A2 | 11/2007 |
| WO | 2010032268 A2 | 3/2010 |
| WO | 2010076622 A1 | 7/2010 |
| WO | 2011036618 A2 | 3/2011 |
| WO | 2011044680 A1 | 4/2011 |
| WO | 2011045789 A1 | 4/2011 |
| WO | 2011119154 A1 | 9/2011 |
| WO | 2012027422 A2 | 3/2012 |
| WO | 2013109608 A2 | 7/2013 |
| WO | 2013109609 A2 | 7/2013 |

OTHER PUBLICATIONS

U.S. Appl. No. 14/516,493—Response to May 9 Office Action filed Aug. 9, 2016, 18 pages.

U.S. Appl. No. 14/516,493—Office Action dated Nov. 17, 2016, 30 pages.

U.S. Appl. No. 14/280,018—Response to Feb. 12 Office Action filed May 12, 2016 , 15 pages.

U.S. Appl. No. 14/280,018—Replacement Response to Feb. 12 Office Action filed Jun. 8, 2016, 16 pages.

U.S. Appl. No. 14/476,694—Office Action dated Nov. 1, 2016, 28 pages.

U.S. Appl. No. 14/154,730—Office Action dated Nov. 6, 2015, 9 pages.

U.S. Appl. No. 14/155,722—Office Action dated Nov. 20, 2015, 14 pages.

U.S. Appl. No. 14/281,817—Office Action dated Sep. 28, 2015, 5 pages.

U.S. Appl. No. 14/154,730—Response to Nov. 6 Office Action filed Feb. 4, 2016, 9 pages.

U.S. Appl. No. 14/154,730—Notice of Allowance dated May 3, 2016, 5 pages.

U.S. Appl. No. 14/154,730—Notice of Allowance dated Jul. 14, 2016, 5 pages.

U.S. Appl. No. 14/280,018—Office Action dated Feb. 12, 2016, 38 pages.

U.S. Appl. No. 14/280,018—Notice of Allowance dated Sep. 7, 2016, 7 pages.

PCT/US2013/021713—International Search Report and Written Opinion dated Sep. 11, 2013, 18 pages.

PCT/US2013/021713—International Preliminary Report on Patentability dated Jul. 22, 2014, 13 pages.

Arthington, et al., "Cross-section Reconstruction During Uniaxial Loading," Measurement Science and Technology, vol. 20, No. 7, Jun. 10, 2009, Retrieved from the Internet: http:iopscience.iop.org/0957-0233/20/7/075701, pp. 1-9.

Barat et al., "Feature Correspondences From Multiple Views of Coplanar Ellipses", 2nd International Symposium on Visual Computing, Author Manuscript, 2006, 10 pages.

Bardinet et al., "Fitting of Iso-Surfaces using Superquadrics and Free-Form Deformations", Proceedings of the IEEE Workshop on Biomedical Image Analysis (WBIA '94), Jun. 24-25, 1994, pp. 184-193.

Butail, S., et al., "Three-Dimensional Reconstruction of the Fast-Start Swimming Kinematics of Densely Schooling Fish," Journal of the Royal Society Interface, Jun. 3, 2011, retrieved from the Internet: http://www.ncbi.nlm.nih.gov/pubmed/21642367, pp. 0, 1-12.

Cheikh et al., "Multipeople Tracking Across Multiple Cameras", International Journal on New Computer Architectures and Their Applications (IJNCAA), vol. 2, No. 1, 2012, pp. 23-33.

Chung, et al., "Recovering LSHGCs and SHGCs from Stereo," International Journal of Computer Vision, vol. 20, No. 1/2, 1996, pp. 43-58.

Cumani, A., et al., "Pattern Recognition: Recovering the 3D Structure of Tubular Objects From Stereo Silhouettes," Pattern Recognition, Elsevier, GB, vol. 30, No. 7, Jul. 1, 1997, Retrieved from the Internet: http://www.sciencedirect.com/science/article/pii/S0031320396001446, pp. 1051-1059.

Davis et al., "Toward 3-D Gesture Recognition", International Journal of Pattern Recognition and Artificial Intelligence, vol. 13, No. 03, 1999, pp. 381-393.

Di Zenzo, S., et al., "Advances in Image Segmentation," Image and Vision Computing, Elsevier, Guildford, GBN, vol. 1, No. 1, Copyright Butterworth & Co Ltd., Nov. 1, 1983, pp. 196-210.

Forbes, K., et al., "Using Silhouette Consistency Constraints to Build 3D Models," University of Cape Town, Copyright De Beers

(56) References Cited

OTHER PUBLICATIONS

2003, Retrieved from the internet: http://www.dip.ee.uct.ac.za/~kforbes/Publications/Forbes2003Prasa.pdf on Jun. 17, 2013, 6 pages.

Heikkila, J. "Accurate Camera Calibration and Feature Based 3-D Reconstruction from Monocular Image Sequences", Infotech Oulu and Department of Electrical Engineering, University of Oulu, 1997, 126 pages.

Kanhangad, V., et al., "A Unified Framework for Contactless Hand Verification," IEEE Transactions on Information Forensics and Security, IEEE, Piscataway, NJ, US., vol. 6, No. 3, Sep. 1, 2011, pp. 1014-1027.

Kim, et al., "Development of an Orthogonal Double-Image Processing Algorithm to Measure Bubble," Department of Nuclear Engineering and Technology, Seoul National University Korea, vol. 39 No. 4, Published Jul. 6, 2007, pp. 313-326.

Kulesza, et al., "Arrangement of a Multi Stereo Visual Sensor System for a Human Activities Space," Source: Stereo Vision, Book edited by: Dr. Asim Bhatti, ISBN 978-953-7619-22-0, Copyright Nov. 2008, I-Tech, Vienna, Austria, www.intechopen.com, pp. 153-173.

May, S., et al., "Robust 3D-Mapping with Time-of-Flight Cameras," 2009 IEEE/RSJ International Conference on Intelligent Robots and Systems, Piscataway, NJ, USA, Oct. 10, 2009, pp. 1673-1678.

Olsson, K., et al., "Shape from Silhouette Scanner—Creating a Digital 3D Model of a Real Object by Analyzing Photos From Multiple Views," University of Linkoping, Sweden, Copyright VCG 2001, Retrieved from the Internet: http://liu.diva-portal.org/smash/get/diva2:18671/FULLTEXT01 on Jun. 17, 2013, 52 pages.

Pedersini, et al., Accurate Surface Reconstruction from Apparent Contours, Sep. 5-8, 2000 European Signal Processing Conference EUSIPCO 2000, vol. 4, Retrieved from the Internet: http://home.deib.polimi.it/sarti/CV_and_publications.html, pp. 1-4.

Rasmussen, Matihew K., "An Analytical Framework for the Preparation and Animation of a Virtual Mannequin forthe Purpose of Mannequin-Clothing Interaction Modeling", A Thesis Submitted in Partial Fulfillment of the Requirements for the Master of Science Degree in Civil and Environmental Engineering in the Graduate College of the University of Iowa, Dec. 2008, 98 pages.

Pavlovic, V., et al., "Visual Interpretation of Hand Gestures for Human-Computer Interaction: A Review," IEEE Transactions on Pattern Analysis and Machine Intelligence, vol. 19, No. 7, Jul. 1997, pp. 677-695.

Wu, Y., et al., "Vision-Based Gesture Recognition: A Review," Beckman Institute, Copyright 1999, pp. 103-115.

Non-Final Office Action for U.S. Appl. No. 14/155,722 dated Nov. 20, 2015.

U.S. Appl. No. 14/281,817—Office Action, dated Sep. 28, 2015, 5 pages.

U.S. Appl. No. 14/262,691—Office Action, dated Dec. 11, 2015, 31 pages.

U.S. Appl. No. 14/476,694—Response to Office Action dated Nov. 1, 2016 filed Jan. 31, 2017, 15 pages.

U.S. Appl. No. 14/476,694—Office Action dated Apr. 7, 2017, 32 pages.

\* cited by examiner

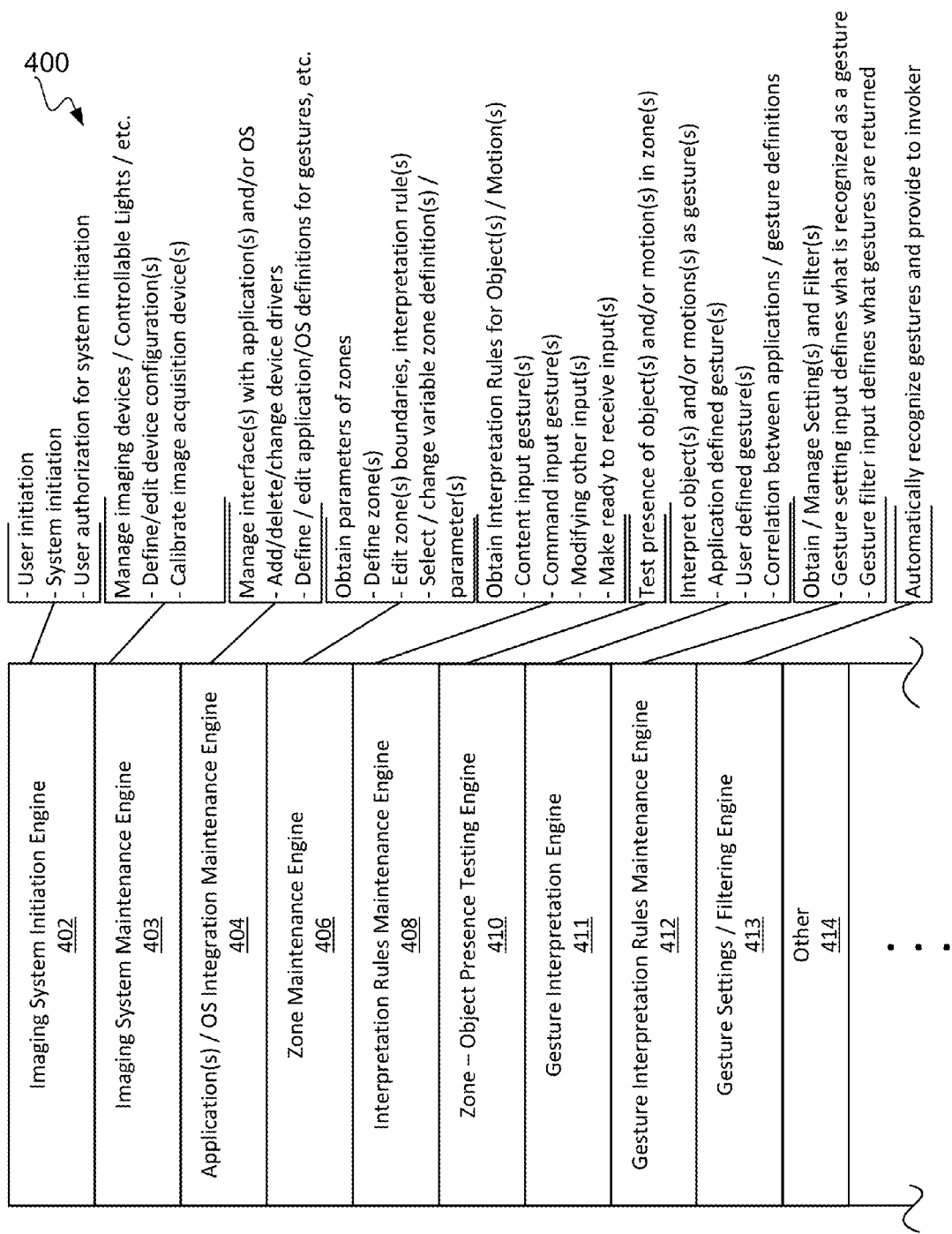

FIG. 4

| Engine | Functions |
|---|---|
| Imaging System Initiation Engine 402 | - User initiation<br>- System initiation<br>- User authorization for system initiation |
| Imaging System Maintenance Engine 403 | - Manage imaging devices / Controllable Lights / etc.<br>- Define/edit device configuration(s)<br>- Calibrate image acquisition device(s) |
| Application(s) / OS Integration Maintenance Engine 404 | - Manage interface(s) with application(s) and/or OS<br>- Add/delete/change device drivers<br>- Define / edit application/OS definitions for gestures, etc. |
| Zone Maintenance Engine 406 | - Obtain parameters of zones<br>- Define zone(s)<br>- Edit zone(s) boundaries, interpretation rule(s)<br>- Select / change variable zone definition(s) / parameter(s) |
| Interpretation Rules Maintenance Engine 408 | - Obtain Interpretation Rules for Object(s) / Motion(s)<br>- Content input gesture(s)<br>- Command input gesture(s)<br>- Modifying other input(s)<br>- Make ready to receive input(s) |
| Zone – Object Presence Testing Engine 410 | - Test presence of object(s) and/or motion(s) in zone(s) |
| Gesture Interpretation Engine 411 | - Interpret object(s) and/or motions(s) as gesture(s)<br>- Application defined gesture(s)<br>- User defined gesture(s)<br>- Correlation between applications / gesture definitions |
| Gesture Interpretation Rules Maintenance Engine 412 | |
| Gesture Settings / Filtering Engine 413 | - Obtain / Manage Setting(s) and Filter(s)<br>- Gesture setting input defines what is recognized as a gesture<br>- Gesture filter input defines what gestures are returned |
| Other 414 | - Automatically recognize gestures and provide to invoker |

400

NON-TACTILE INTERFACE SYSTEMS AND METHODS

RELATED APPLICATION

This application claims the benefit of U.S. Patent Application No. 61/816,487, titled "NON-TACTILE INTERFACE SYSTEMS AND METHODS," filed 26 Apr. 2013. The provisional application is hereby incorporated by reference for all purposes.

FIELD OF THE TECHNOLOGY DISCLOSED

The technology disclosed relates generally to human-machine interactivity, and in particular to machine responsiveness to dynamic user movements and gestures.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Traditionally, users have interacted with electronic devices (such as a computer or a television) or computing applications (e.g., computer games) using external input devices (e.g., a keyboard or mouse). The user manipulates the input devices to facilitate communication of user commands to the electronic devices or computing applications to perform a particular operation (e.g., selecting a specific entry from a menu of operations). Conventional input devices, however, can be quite unfriendly. They can include multiple buttons and complex configurations, making correct use of these input devices challenging to the user. Unfortunately, actions performed on an input device generally do not correspond in any intuitive sense to the resulting changes on, for example, a screen display controlled by the device. Input devices can also be lost, and the frequent experience of searching for misplaced devices has become a frustrating staple of modern life.

Touch screens implemented directly on user-controlled devices have obviated the need for separate input devices. A touch screen detects the presence and location of a "touch" performed by a user's finger or other object on the display screen, enabling the user to enter a desired input by simply touching the proper area of a screen. Unfortunately, touch screens are impractical for many applications (e.g., large entertainment devices, devices that the user views from a distance, etc.). Therefore, there is a need for improved touch-free mechanisms that enable users to interact with devices and/or applications.

SUMMARY

Aspects of the systems and methods described herein provide for improved image-based machine interactivity and/or communication by interpreting the position and/or motion of an object (including objects having one or more articulating members, e.g., hands, but more generally humans and/or animals and/or machines). Among other aspects, implementations can enable automatically (e.g., programmatically) to determine a correct way to interpret inputs detected from positional information (e.g., position, volume, and/or surface characteristics) and/or motion information (e.g., translation, rotation, and/or other structural change) of a portion of a hand or other detectable object moving in free-space. In some implementations, this is based upon a zone determined from the hand's (or other object's) position. Inputs can be interpreted from one or a sequence of images in conjunction with receiving input, commands, communications and/or other user-machine interfacing, gathering information about objects, events and/or actions existing or occurring within an area being explored, monitored, or controlled, and/or combinations thereof.

According to one aspect, therefore, a method implementation for processing an input includes detecting a portion of a hand and/or other detectable object in a region of space. The method further includes determining a zone corresponding to the region of space in which the portion of the hand or other detectable object was detected. Also, the method can include determining from the zone a correct way to interpret inputs made by a position, shape or a motion of the portion of the hand or other detectable object.

Although one advantage provided by an implementation of the disclosed technology is the ability to dispense with the need for a physical touch screen, some implementations of the disclosed technology replicate the user experience of a touch screen in free-space. Most simply, the user's movements in a spatial region can be monitored and a plane computationally defined relative to the user's movements. This approach frees the user from having to gesture relative to a fixed plane in space; rather, the user moves his hands and/or fingers, for example, relative to an imagined plane that feels natural to him, as if attempting to manipulate a touch screen that controls a viewed display. Some implementations of the disclosed technology sense the user's movements and reconstruct the approximate location of the plane, and interpret the user's gestures relative thereto. For example, a system implementation may not react until the user has reached or broken the virtual plane that the system has defined. The dynamic relationship between the user's gestures and the plane can be mapped to any desired response on, for example, the display viewed by the user. In some implementations, the user's movements against the virtual plane drive a rendering system that draws on the display the trajectories traced by the user in space. The system can map user gestures that penetrate the plane to a parameter such as pressure—for example, drawing a thicker line the more the user's movements take place beyond the plane, as if the user were pressing on a touch screen. Of course, because the user's movements are necessarily not precise, implementations of the disclosed technology can computationally discriminate between gestures that, while not perfectly aligned with the plane, manifest an intention to provide a touch signal on the plane to draw or control something, as opposed to gestures that represent an attempt to withdraw from the plane or to penetrate it. Some implementations define the plane with a spatial thickness, and in certain implementations that thickness is altered based on analysis of the user's movements—in effect, the plane is personalized to the user based on her particular style of interaction therewith, which depends on the user's motor control and hand-eye coordination, among other factors. This personalization can be dynamic, i.e., revised as more user movements are detected, since it can change even within a session. Parameters specifying the plane's thickness can be associated with the particular user, e.g., stored in the user's record in a database of users.

The plane of interaction is not only subjective to the user but can shift as the user changes position (e.g., leans back) or simply because the plane is in the user's mind rather than visible in space. Implementations of the disclosed technology can therefore be configured to tolerate variation in the user's perception of the plane's location in space. For example, the computationally defined location of the plane can "follow" the user's gestures as if tethered to the user's fingers by a string, moving toward the user as her gestures retreat from a previous average location; gestural movements beyond this revised location are interpreted as penetrative.

Techniques for determining positional, shape and/or motion information about an object are described in further detail in co-pending U.S. Ser. No. 13/414,485, filed Mar. 7, 2012, and Ser. No. 13/742,953, filed Jan. 16, 2013, the entire disclosures of which are hereby incorporated by reference as if reproduced verbatim beginning here.

Advantageously, some implementations can provide for improved interface with computing and/or other machinery than would be possible with heretofore known techniques. In some implementations, a richer human-machine interface experience can be provided. The following detailed description together with the accompanying drawings will provide a better understanding of the nature and advantages provided for by implementations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 4 illustrates a diagram of various modules implementing features and/or functionality provided by a zoned non-tactile interface implementation.

DETAILED DESCRIPTION

Implementations described herein with reference to examples can provide for automatically (e.g., programmatically) determining a correct way to interpret inputs detected from positional information (e.g., position, volume, shape, and/or surface characteristics) and/or motion information (e.g., translation, rotation, and/or other structural change) of a portion of a hand or other detectable object based upon a zone determined from the hand's (or other object's) position. Inputs can be interpreted from one or a sequence of images in conjunction with receiving input, commands, communications and/or other user-machine interfacing, gathering information about objects, events and/or actions existing or occurring within an area being explored, monitored, or controlled, and/or combinations thereof. In particular, inputs can be interpreted, for example, based on their detection within one of a plurality of spatially defined zones, based on the relationship between the gesture and a virtual plane defined in the monitored space, and/or both—i.e., a different plane can be defined within each of the zones, so that the perceived "touch" responsiveness depends on zone-specific plane parameters.

As used herein, a given signal, event or value is "based on" a predecessor signal, event or value of the predecessor signal, event or value influenced by the given signal, event or value. If there is an intervening processing element, step or time period, the given signal, event or value can still be "based on" the predecessor signal, event or value. If the intervening processing element or step combines more than one signal, event or value, the signal output of the processing element or step is considered "based on" each of the signal, event or value inputs. If the given signal, event or value is the same as the predecessor signal, event or value, this is merely a degenerate case in which the given signal, event or value is still considered to be "based on" the predecessor signal, event or value. "Responsiveness" and/or "dependency" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Figure 1A:
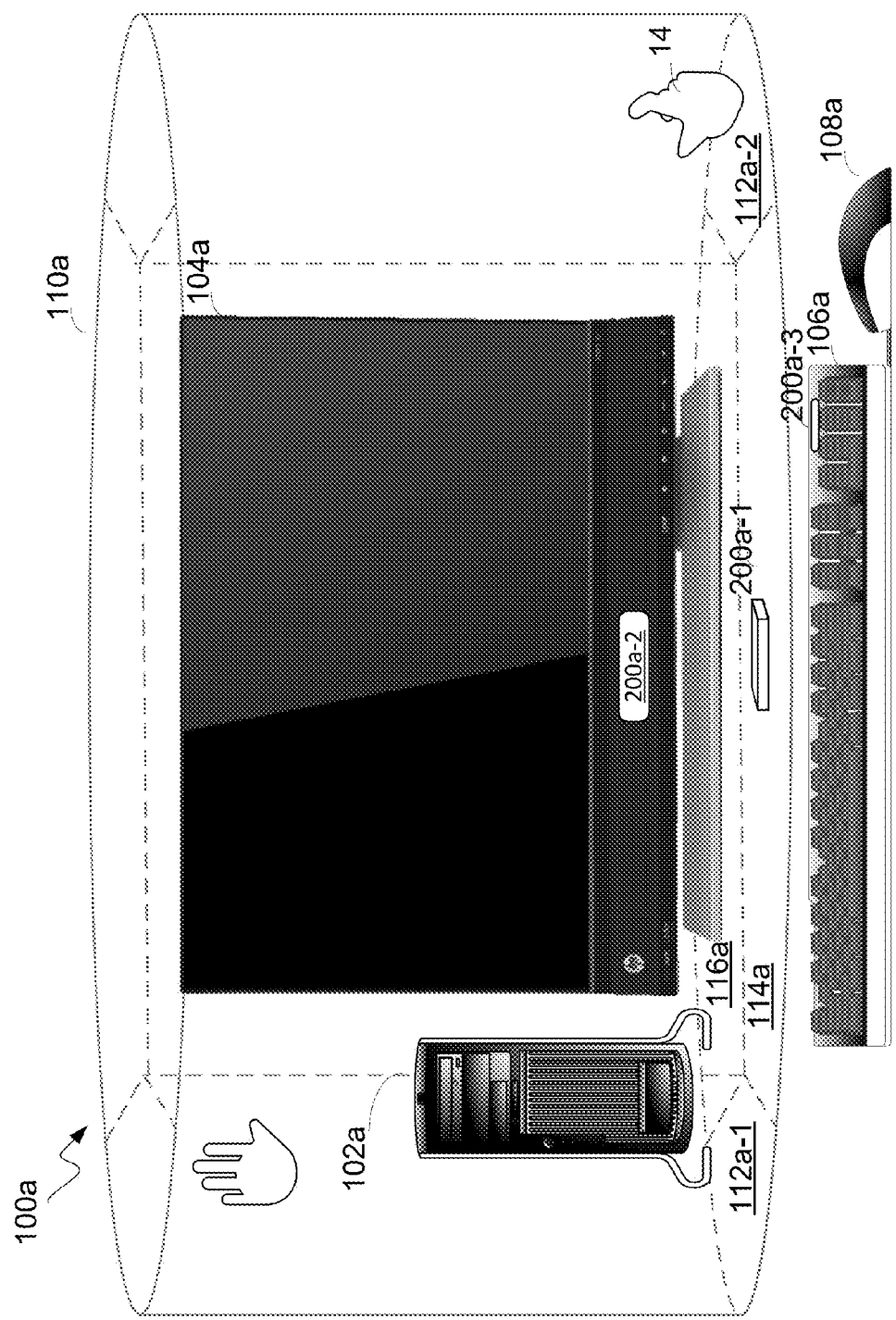
FIGS. 1A and 1B illustrate example interface environments in which implementations can be realized.
Figure 1B:
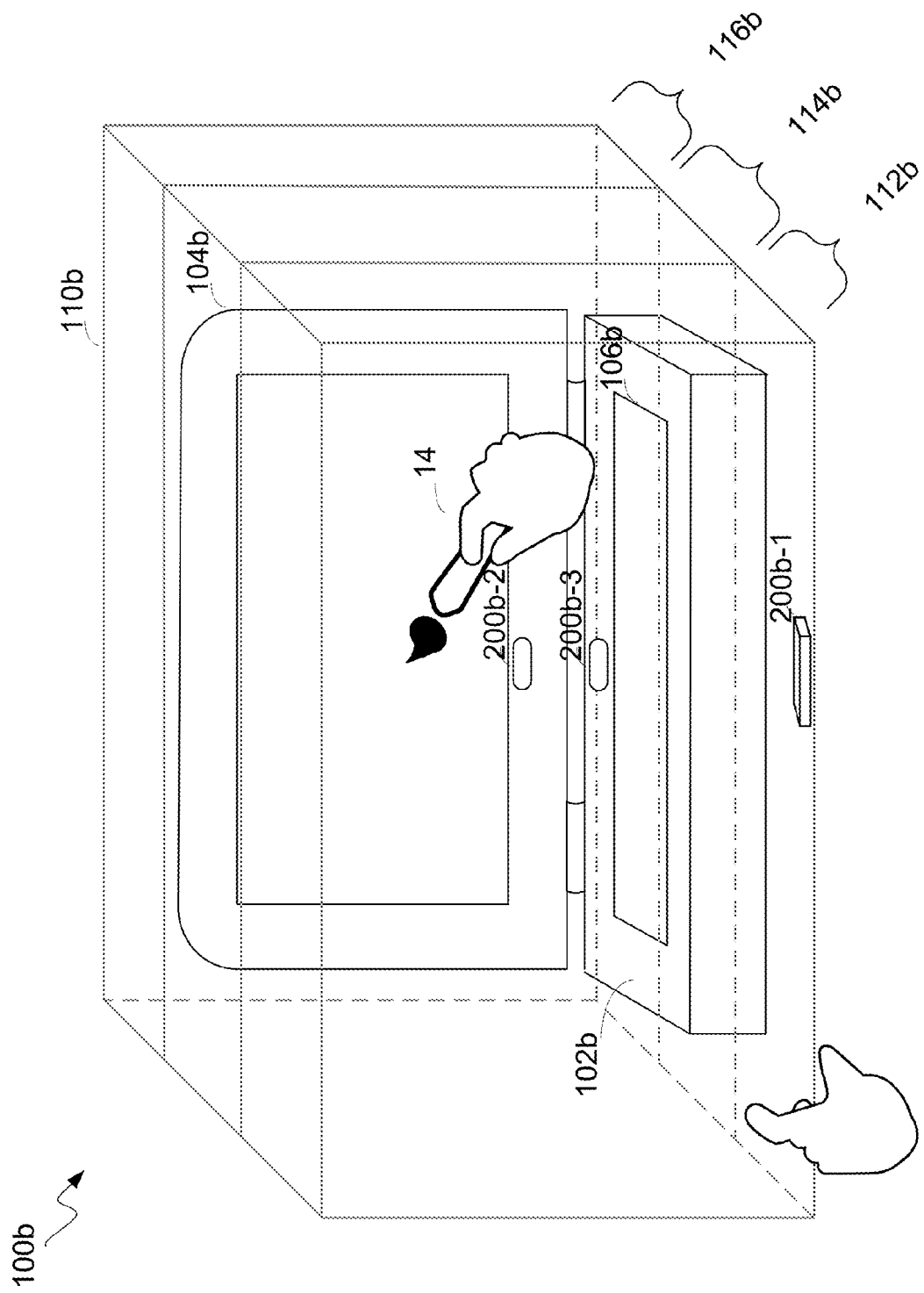

FIGS. 1A and 1B illustrate example interface environments in which implementations can be realized, representing but a few examples of many possible machinery types or configurations capable of being used in implementations hereof, including computing machine configurations (e.g., a workstation, personal computer, laptop, notebook, smartphone or tablet, or a remote terminal in a client server relationship), medical machine applications (e.g., MRI, CT, x-may, heart monitors, blood chemistry meters, ultrasound and/or other types of medical imaging or monitoring devices, and/or combinations thereof, laboratory test and diagnostics systems and/or nuclear medicine devices and systems); prosthetic applications (e.g., interfaces to devices providing assistance to persons under handicap, disability, recovering from surgery, and/or other infirmity); defense applications (e.g., aircraft or vehicle operational control, navigations systems control, on-board counter-measures control, and/or environmental systems control); automotive applications (e.g., automobile operational systems control, navigation systems control, on-board entertainment systems control and/or environmental systems control); security applications (e.g., secure areas monitoring); manufacturing and/or process applications (e.g., assembly robots, automated test apparatus, work conveyance devices, i.e., conveyors, and/or other factory floor systems and devices, genetic sequencing machines, semiconductor fabrication related machinery, chemical process machinery, refinery machinery, and/or the like); and/or combinations thereof.

Reference throughout this specification to "one example," "an example," "one implementation," "an implementation,"

"one implementation," or "an implementation" means that a particular feature, structure, or characteristic described in connection with the example is included in at least one example of the disclosed technology. Thus, the occurrences of the phrases "in one example," "in an example," "in one implementation," "in an implementation," "one implementation," or "an implementation" in various places throughout this specification are not necessarily all referring to the same example. Furthermore, the particular features, structures, routines, steps, or characteristics can be combined in any suitable manner in one or more examples of the technology. The headings provided herein are for convenience only and are not intended to limit or interpret the scope or meaning of the claimed technology.

FIG. 1A illustrates an example interface environment according to a particular implementation. This diagram is merely an example; one of ordinary skill in the art will recognize many other variations, alternatives, and modifications. FIG. 1A shows a plurality of integral, non-integral and/or communicatively coupled elements, configurable into a more distributed or more integrated manner, for providing an environment in which users can access resources implemented as hardware, installed software, downloadable software and/or services made available over a network for example, and/or combinations thereof. Interface implementations can be implemented to operate in conjunction with installed application(s), and/or or can be implemented as multiple programs in a distributed computing environment. As shown in FIG. 1A, an example computing environment includes a system 100a including wired and/or wirelessly communicatively coupled components of a tower 102a, a display device 104a, a keyboard 106a and optionally a tactile pointing device (e.g., mouse) 108a. In some implementations, the computing machinery of tower 102a can be integrated into display device 104a in an "all in one" configuration. A position and motion sensing device 200a includes all or a portion of a non-tactile interface system that receives non-tactile input based upon detected position(s), shape(s) and/or motion(s) made by a hand 14 and/or any other detectable object within the space monitored by the sensing device 200a. Position and motion sensing device 200a can be embodied as a stand-alone entity as indicated at 200a-1 or can be integrated into the system 100a (e.g., directly into display device 104a as indicated at 200a-2 and/or within keyboard 106a as indicated at 200a-3) or into another intelligent device, e.g., a computer, workstation, laptop, notebook, smartphone, tablet, smart watch or other type of wearable intelligent device(s) and/or combinations thereof.

Motion sensing device 200a is capable of detecting position as well as motion of hands and/or portions of hands and/or other detectable objects (e.g., a pen, a pencil, a stylus, a paintbrush, an eraser, other tools, and/or a combination thereof), within a region of space 110a from which it is convenient for a user to interact with system 100a. Region 110a can be situated in front of, nearby, and/or surrounding system 100a. While FIG. 1A illustrates devices 200a-1, 200a-2 and 200a-3, it will be appreciated that these are alternative implementations shown in FIG. 1A for purposes of clarity. Keyboard 106a and position and motion sensing device 200a are representative types of user input devices. Other examples of user input devices (not shown in FIG. 1A) such as, for example, a touch screen, light pen, mouse, track ball, touch pad, data glove and so forth can be used in conjunction with computing environment 100a. Accordingly, FIG. 1A is representative of but one type of system implementation. It will be readily apparent to one of ordinary skill in the art that many system types and configurations are suitable for use in conjunction with the disclosed technology.

Tower 102a and/or position and motion sensing device 200a and/or other elements of system 100a can implement functionality to logically partition region 110a into a plurality of zones (112a-1, 112a-2, 114a, 116a of FIG. 1A) which can be arranged in a variety of configurations. Accordingly, objects and/or motions occurring within one zone can be afforded differing interpretations than like (and/or similar) objects and/or motions occurring in another zone.

Painting Program Example

In one example, objects or motions detected within zone 112a-1 and/or zone 112a-2 (FIG. 1A) can be interpreted by system 100a as control information. One illustrative example application is a painting and/or picture editing program including a virtual "brush" (or pen, pencil, eraser, stylus, paintbrush or other tool) can apply markings to a virtual "canvas." In such application(s), zone 112a-1 and/or zone 112a-2 can be designated as a "Menu/Tool selection area" in which the virtual pen and/or brush is not in contact with the virtual "canvas" and in which tool icons and/or menu options appear on screen 104a. Inputs of detected objects and/or motions in these zones can be interpreted firstly to make choices of tools, brushes, canvases and/or settings.

Zone 114a can be used as, for example, a "ready" area in which objects or motion inputs are interpreted as non-committed content inputs and/or as modifiers for inputs made in one or more of other zones. In the paint program example, zone 114a can be a "hover area" in which the point of the virtual "brush" (or pen, pencil, eraser, stylus, paintbrush or other-tool) is not in contact with the virtual "canvas"; rather, the virtual brush is "hovering" above the virtual canvas. The paint program can respond to objects and/or motion inputs in various ways—for example, the cursor color can change to reflect that the program is in a hover mode. Menu/tool icons, if displayed, can be hidden to indicate the system is ready to receive content inputs. Various guidelines (or guide points, cross-hairs, or the like) can be made to appear on the screen to represent where the virtual brush can contact the virtual canvas based upon the object and/or motion detected. A projected contact point and/or target area indicated by the position of a tool for example can be highlighted with color change, increased magnification (i.e., "zoom in"), and/or dotted (or dashed) lines, and/or combinations thereof can assist a user.

Zone 116a can serve as a content input area in which objects or motion inputs are interpreted as content. In the paint program example, zone 116a can serve as a "painting area" in which the point of the virtual brush (or pen, pencil, eraser, stylus, paintbrush or other virtualized tool) is in contact with the virtual "canvas" so as to mark the canvas. Accordingly, the paint program can receive content input(s) in zone 116a in the form of objects and/or motions, and reflect the input(s) as the results of a user "painting" on the virtual canvas with the virtual brush. Various indicators (e.g., the cursor or other contact indicator) can change color and/or shape to signify to the user that "contact" between tool and canvas has occurred. Further, input(s) detected as objects or motions can be interpreted as actions of the virtual brush that can be reflected onto the virtual canvas as brush strokes, lines, marks, shading, and/or combinations thereof.

In an implementation, substantially contemporaneous inputs of objects and/or motion in two or more zones can indicate to system 100a that the inputs should be interpreted together. For example, system 100a can detect input(s) of content made by a virtual brush in zone 116a contemporaneous with inputs of commands in zone 112a-1 and/or zone 112a-2. Accordingly, the user can employ this mechanism to alter the characteristics (e.g., color, line width, brush stroke, darkness, etc.) of the content input as the content input is being made.

While illustrated with examples using adjacent zones for ease of illustration, there is no special need for zones to touch one another; thus in implementations zones can be contiguous, dis-contiguous or combinations thereof. In some implementations, inter-zone spaces can be advantageously interposed between zones to facilitate application specific purposes. Further, as illustrated by zone 112a-1 and zone 112a-2, zones need not be contiguous. In other words, system 100a can treat inputs made in either zone 112a-1 or zone 112a-2 equivalently, or similarly, thereby providing the ability to some implementations to accommodate "handedness" of users.

Additional Zone Maps

FIG. 1B illustrates an example interface environment according to a particular implementation. As shown by FIG. 1B, an example computing environment 100b includes wired and/or wirelessly communicatively coupled components of a laptop machine 102b, integrated (or semi-integrated or detachable) display 104b, a keyboard 106b. Optionally, a tactile pointing device (not shown), such as a joystick pointer and/or a touch pad can also be included in machine 102b. Other devices (e.g., higher resolution displays, external keyboards, and/or other user input devices, such as for example, light pen, mouse, track ball, touch pad, data glove and so forth) can be coupled to machine 102b to enhance operability and/or user convenience.

A position and motion sensing device 200b (e.g., 200b-1, 200b-2 and/or 200b-3) provides for receiving non-tactile inputs based upon detected position(s) and/or motion(s) made by a hand 14 and/or any other detectable object. Position and motion sensing device 200b can be embodied as a stand-alone entity 200b-1 or integrated directly into display device 104b as integrated device 200b-2 and/or keyboard 106b as integrated device 200b-3. While FIG. 1B illustrates devices 200b-1, 200b-2 and 200b-3, it will be appreciated by one skilled in the art that these are illustrative of alternative implementations shown in FIG. 1B for clarity sake. Alternatively, position and motion sensing device 200b can be integrated into another intelligent device, e.g., a computer, workstation, laptop, notebook, smartphone, tablet, smart watch or other type of wearable intelligent device(s) and/or combinations thereof. Position and motion sensing device 200b can be communicatively coupled with, and/or integrated within, one or more of the other elements of system 100b, and can interoperate cooperatively with component(s) of the system 100b to provide non-tactile interface capabilities.

As shown in FIG. 1B, laptop 102b and/or position and motion sensing device 200b and/or other elements of system 100b can implement functionality to logically partition region 110b into a plurality of zones (112b, 114b, 116b) which can be arranged in a variety of configurations. Noteworthy is that the zones 112b, 114b and 116b can differ in size, arrangement, and assigned functionality from the zones 112a, 114a and 116a illustrated by FIG. 1A. Accordingly, objects and/or motions occurring within one zone can be afforded differing interpretations than like (and/or similar) objects and/or motions occurring in another zone.

Figure 2:
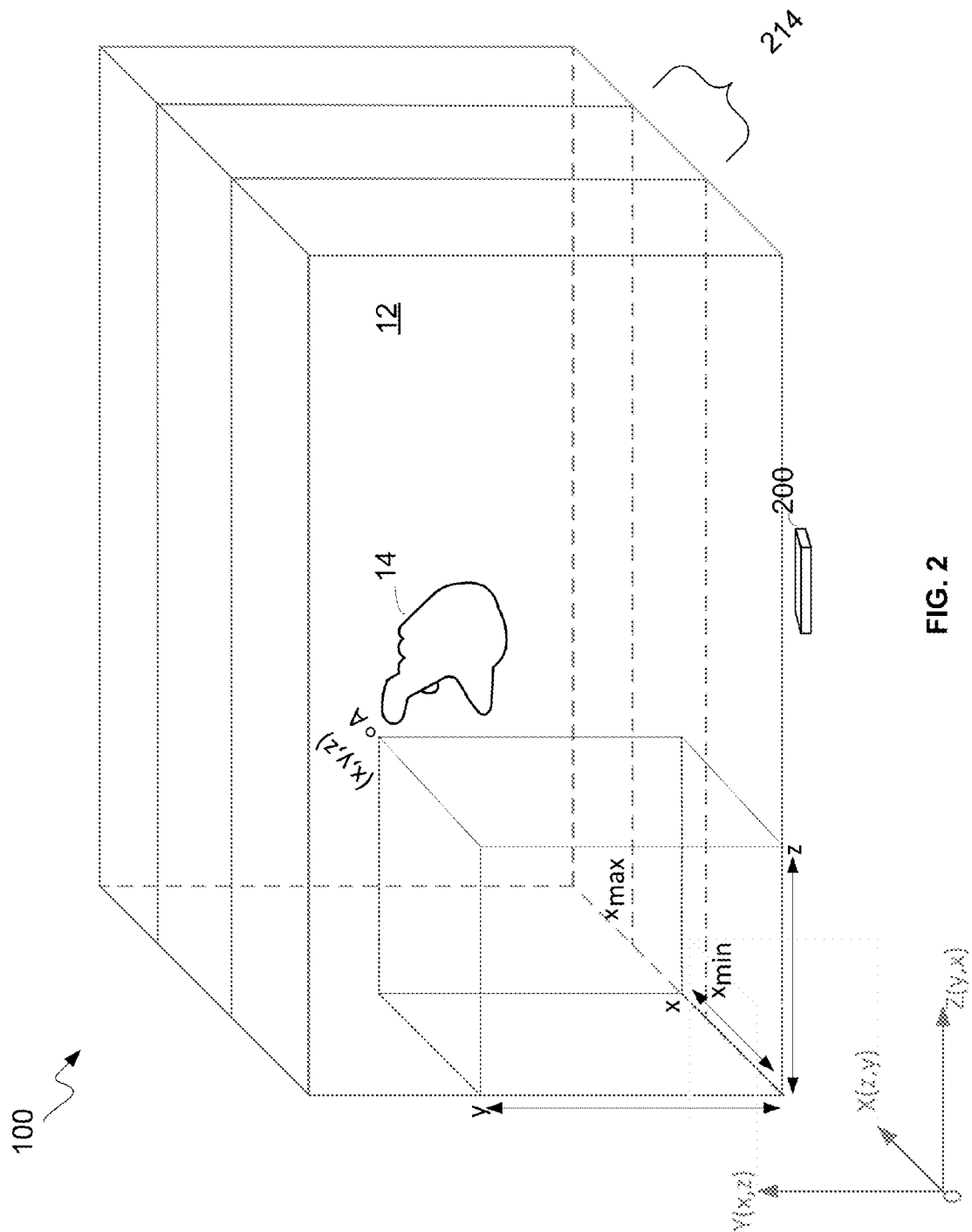
FIG. 2 illustrates a non-tactile interface implementation in which one or more objects and/or motions are detected and their presence within one or more zonal boundaries are determined.

FIG. 2 illustrates a non-tactile interface implementation in which object(s) and/or motion(s) are detected and presence within zonal boundary or boundaries is determined. As show in FIG. 2, one or more zones, including a zone 214, can be defined in space 12 based upon zonal boundaries that can be provided by rule, program code, empirical determination, and/or combinations thereof. Positional and/or motion information provided by position and motion sensing device 200 can be used to determine a position A of an object 14 within space 12. Generally, an object 14 having an x-coordinate x will be within the x-dimensional boundaries of the zone if $xmin \leq x \leq xmax$. If this does not hold true, then the object 14 does not lie within the zone having x-dimensional boundaries of (xmin, xmax). Analogously, object 14 with a y-coordinate y and z-coordinate z will be within the y-dimensional boundaries of the zone if $ymin \leq y \leq ymax$ holds true and will be within the z-dimensional boundaries of the zone if $zmin \leq z \leq zmax$ holds true. Accordingly, by checking each dimension for the point of interest for presence within the minimum and maximum dimensions for the zone, it can be determined whether the point of interest lies within the zone. One method implementation for making this determination is described below in further detail with reference to FIG. 3I. While illustrated generally using Cartesian (x,y,z) coordinates, it will be apparent to those skilled in the art that other coordinate systems, e.g., cylindrical coordinates, spherical coordinates, etc. can be used to determine the dimensional boundaries of the zone(s).

In summary, the above painting program example demonstrates the concept of zones: determining from a zone a correct way to interpret inputs; using an image capturing system; and analyzing captured images to detect at least one edge of the object, using that information to determine an associated position and/or motion.

A user draws with their finger as a virtual brush, applying marks to a virtual canvas after selecting a paint color and brush thickness in a Menu/Tool selection zone. The finger position and/or motion in space define the position and/or motion of the brush. A motion sensor provides input to an imaging analysis system that detects at least one edge to determine the zone, and the user selects a modifier to specify the width of the brush stroke. The system interprets that the detected finger is now a red paint brush drawing an apple onto the canvas, with a brush stroke width specified by the 'modifier' input zone. The user pauses with their finger paintbrush hovering above the virtual canvas, in a 'hover' zone, to admire the apple painting before waving their finger in midair to paint a bite in the apple image. When the artist steps back to view their canvas from an alternate perspective, the application can determine the new location of the finger-turned-paintbrush and will add that additional region of space to a set of zones in which the brush object can be found.

Control Object Tracking

Further, the position and shape of the object can be determined based on the locations of its edges in time-correlated images from two different cameras, and motion (including articulation) of the object can be determined from analysis of successive pairs of images. Examples of techniques that can be used to determine an object's position, shape and motion based on locations of edges of the object are described in co-pending U.S. Ser. No. 13/414,485, filed Mar. 7, 2012, the entire disclosure of which is incorporated herein by reference. Those skilled in the art with access to the present disclosure will recognize that other techniques for determining position, shape and motion of an object based on information about the location of edges of the object can also be used.

In accordance with the '485 application, an object's motion and/or position is reconstructed using small amounts of information. For example, an outline of an object's shape, or silhouette, as seen from a particular vantage point can be used to define tangent lines to the object from that vantage point in various planes, referred to herein as "slices." Using as few as two different vantage points, four (or more) tangent lines from the vantage points to the object can be obtained in a given slice. From these four (or more) tangent lines, it is possible to determine the position of the object in the slice and to approximate its cross-section in the slice, e.g., using one or more ellipses or other simple closed curves. As another example, locations of points on an object's surface in a particular slice can be determined directly (e.g., using a time-of-flight camera), and the position and shape of a cross-section of the object in the slice can be approximated by fitting an ellipse or other simple closed curve to the points. Positions and cross-sections determined for different slices can be correlated to construct a three-dimensional (3D) model of the object, including its position and shape. A succession of images can be analyzed using the same technique to model motion of the object. Motion of a complex object that has multiple separately articulating members (e.g., a human hand) can be modeled using these techniques.

More particularly, an ellipse in the xy plane can be characterized by five parameters: the x and y coordinates of the center (xC, yC), the semi-major axis, the semi-minor axis, and a rotation angle (e.g., the angle of the semi-major axis relative to the x axis). With only four tangents, the ellipse is underdetermined. However, an efficient process for estimating the ellipse in spite of this fact involves making an initial working assumption (or "guess") as to one of the parameters and revisiting the assumption as additional information is gathered during the analysis. This additional information can include, for example, physical constraints based on properties of the cameras and/or the object. In some circumstances, more than four tangents to an object can be available for some or all of the slices, e.g., because more than two vantage points are available. An elliptical cross-section can still be determined, and the process in some instances is somewhat simplified as there is no need to assume a parameter value. In some instances, the additional tangents can create additional complexity. In some circumstances, fewer than four tangents to an object can be available for some or all of the slices, e.g., because an edge of the object is out of range of the field of view of one camera or because an edge was not detected. A slice with three tangents can be analyzed. For example, using two parameters from an ellipse fit to an adjacent slice (e.g., a slice that had at least four tangents), the system of equations for the ellipse and three tangents is sufficiently determined that it can be solved. As another option, a circle can be fit to the three tangents; defining a circle in a plane requires only three parameters (the center coordinates and the radius), so three tangents suffice to fit a circle. Slices with fewer than three tangents can be discarded or combined with adjacent slices.

One approach to determine geometrically whether an object corresponds to an object of interest includes is to look for continuous volumes of ellipses that define an object and discard object segments geometrically inconsistent with the ellipse-based definition of the object—e.g., segments that are too cylindrical or too straight or too thin or too small or too far away—and discarding these. If a sufficient number of ellipses remain to characterize the object and it conforms to the object of interest, it is so identified, and can be tracked from frame to frame.

In some implementations, each of a number of slices is analyzed separately to determine the size and location of an elliptical cross-section of the object in that slice. This provides an initial 3D model (specifically, a stack of elliptical cross-sections), which can be refined by correlating the cross-sections across different slices. For example, it is expected that an object's surface will have continuity, and discontinuous ellipses can accordingly be discounted. Further refinement can be obtained by correlating the 3D model with itself across time, e.g., based on expectations related to continuity in motion and deformation.

Flow Diagrams of Zone Interpretation

Figure 3A:
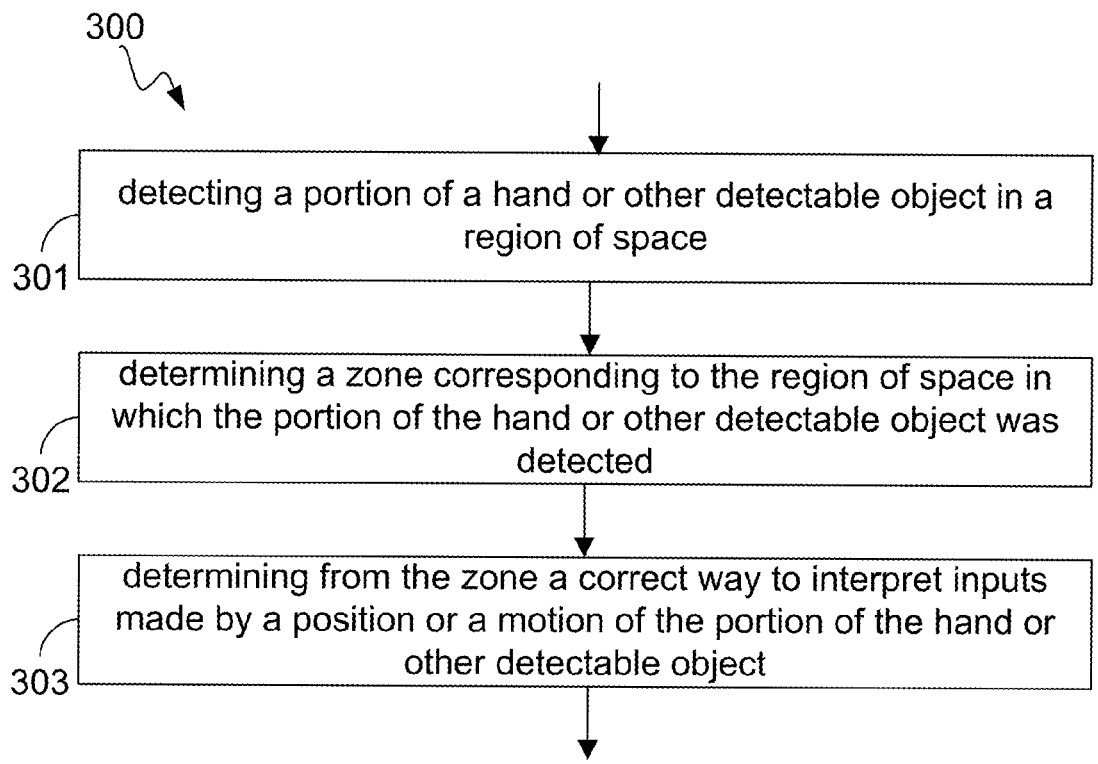
FIGS. 3A-3K illustrate flow diagrams of example methods for processing input in an implementation.

FIG. 3A illustrates a flow diagram 300 of an example input processing method in an implementation. The flow diagram 300 illustrates processes operative within system 100 and carried out upon one or more computing devices in system 100. At action 301, a portion of a hand or other detectable object in a region of space can be detected. A detectable object is one that is not completely translucent to electromagnetic radiation (including light) at a working wavelength. Common detectable objects useful in various implementations include without limitation a brush, pen or pencil, eraser, stylus, paintbrush and/or other tool and/or combinations thereof.

Figure 3B:
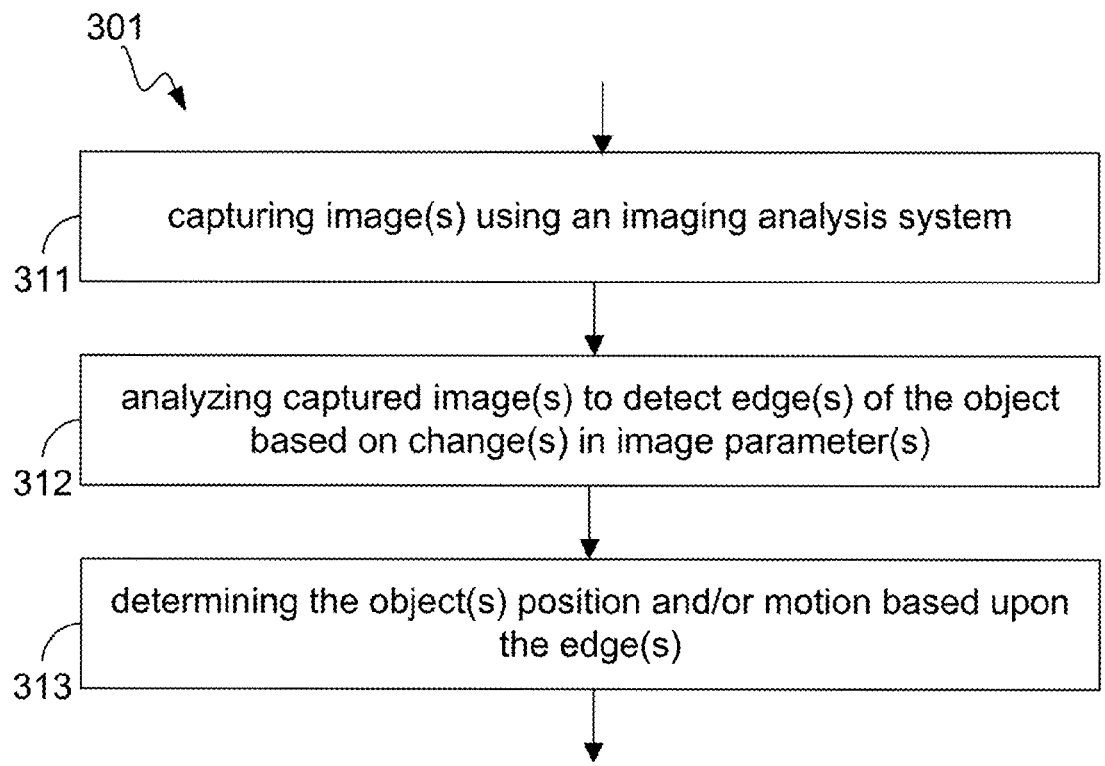

Objects can be detected in a variety of ways, but in an implementation and by way of example, FIG. 3B illustrates a flow diagram 301 of one method for detecting objects. At action 311, images captured using an imaging analysis system embodied in system 100. At action 312, captured images are analyzed to detect edges of the object based on changes in parameters (e.g., brightness, etc.). A variety of analysis methodologies suitable for providing edge detection can be employed in implementations. Some example analysis implementations are discussed below with reference to FIGS. 3B1 and 3B2. At action 313, an edge-based algorithm is used to determine the object's position and/or motion. This algorithm can be, for example, any of the tangent-based algorithms described in the above-referenced '485 application; however, other algorithms can also be used in some implementations. Further reference can be had to co-pending U.S. Ser. No. 13/414,485, filed Mar. 7, 2012, and Ser. No. 13/742,953, filed Jan. 16, 2013, the entire disclosures of which are incorporated by reference as if reproduced verbatim beginning here.

Figure 3C:
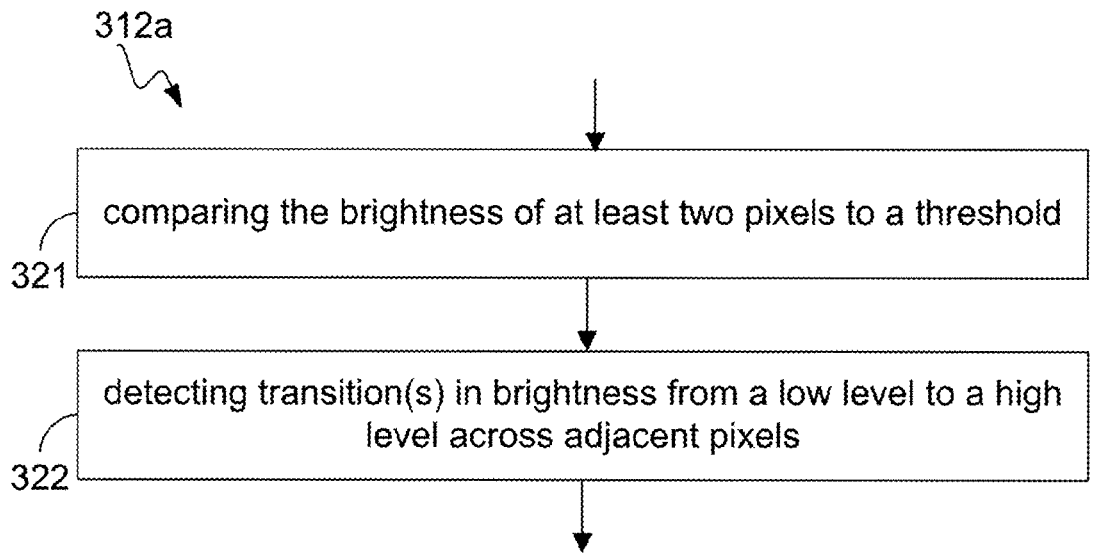
Figure 3D:
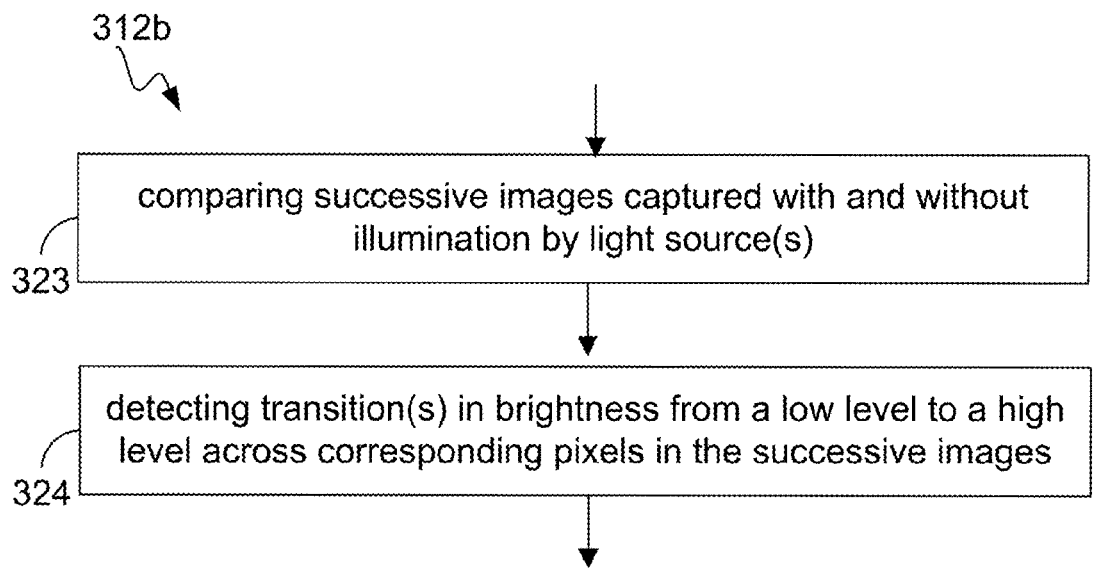

Edge detection analysis can be achieved by various algorithms and/or mechanisms. For example, FIG. 3C illustrates a flow diagram 312a of one method for detecting edges of object(s). This implementation can include action 321, in which the brightness of two or more pixels is compared to a threshold. At action 322, transition(s) in brightness from a low level to a high level across adjacent pixels are detected. In another example, FIG. 3D illustrates a flow diagram 312b of an alternative method for detecting edges of object(s), including action 323 of comparing successive images captured with and without illumination by light source(s). At action 324, transition(s) in brightness from a low level to a high level across corresponding pixels in the successive images are detected.

Figure 3E:
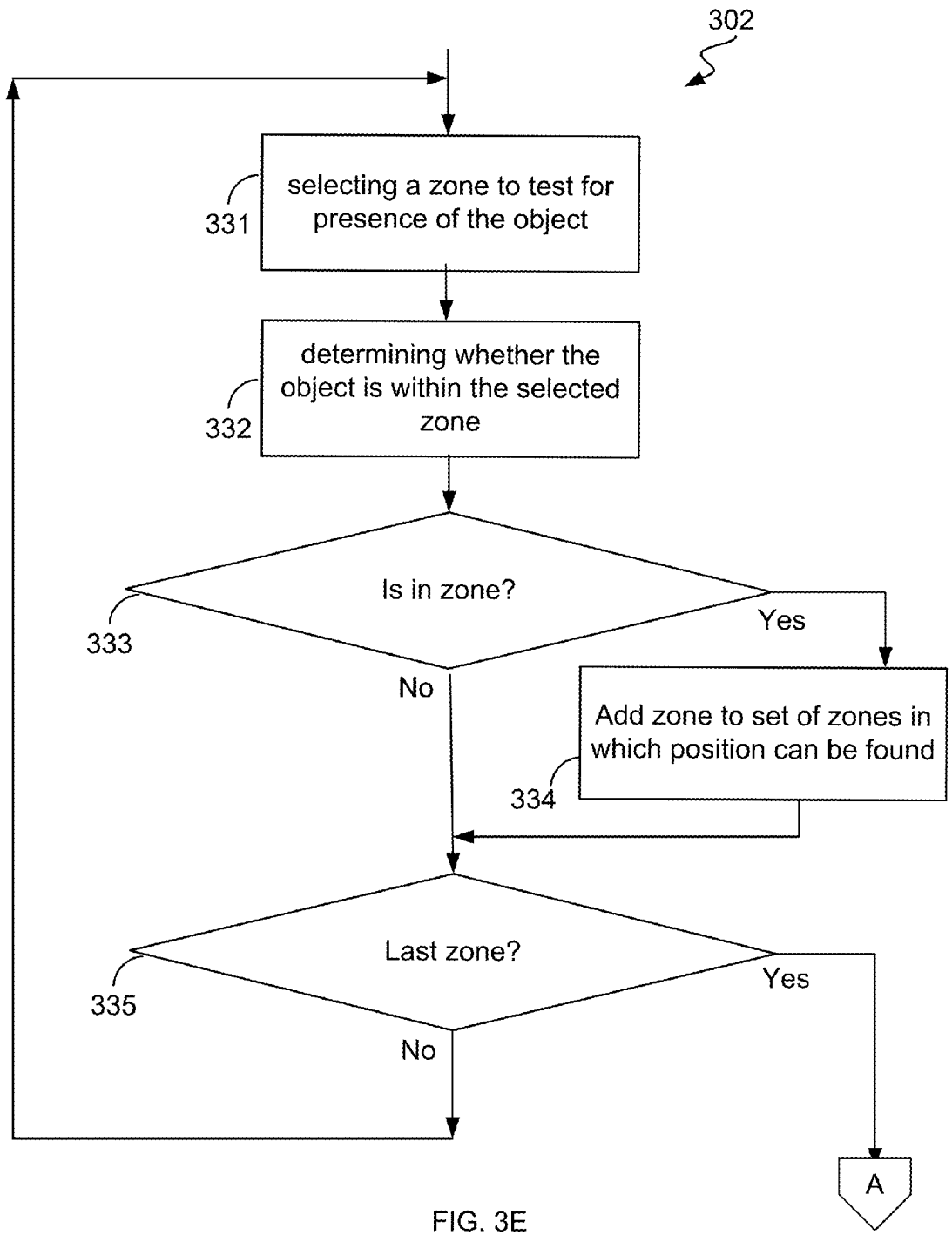

With renewed reference to FIG. 3A, at action 302, a zone can be determined that corresponds to the region of space in which the portion of the hand or other detectable object was detected. In an implementation and by way of example, FIG. 3E illustrates a flow diagram of one implementation for determining a zone corresponding to the region of space in which the portion of the hand or other detectable object was detected. As shown in FIG. 3E, a representative method includes action 331 in which a zone is selected in which to test for presence of the object. At action 332, it is determined whether the object is within the selected zone. At action 333, when the object is determined to be within the selected zone, then, at action 334, the zone is added to a set of zones in which the object can be found. Otherwise, or in any event, at action 335, a check whether there are any further zones to test is made. If there are further zones to test, then flow continues with action 331 to check the next zone. In an implementation, the procedure illustrated in FIG. 3E completes and returns the set of zones built in action 334.

Figure 3F:
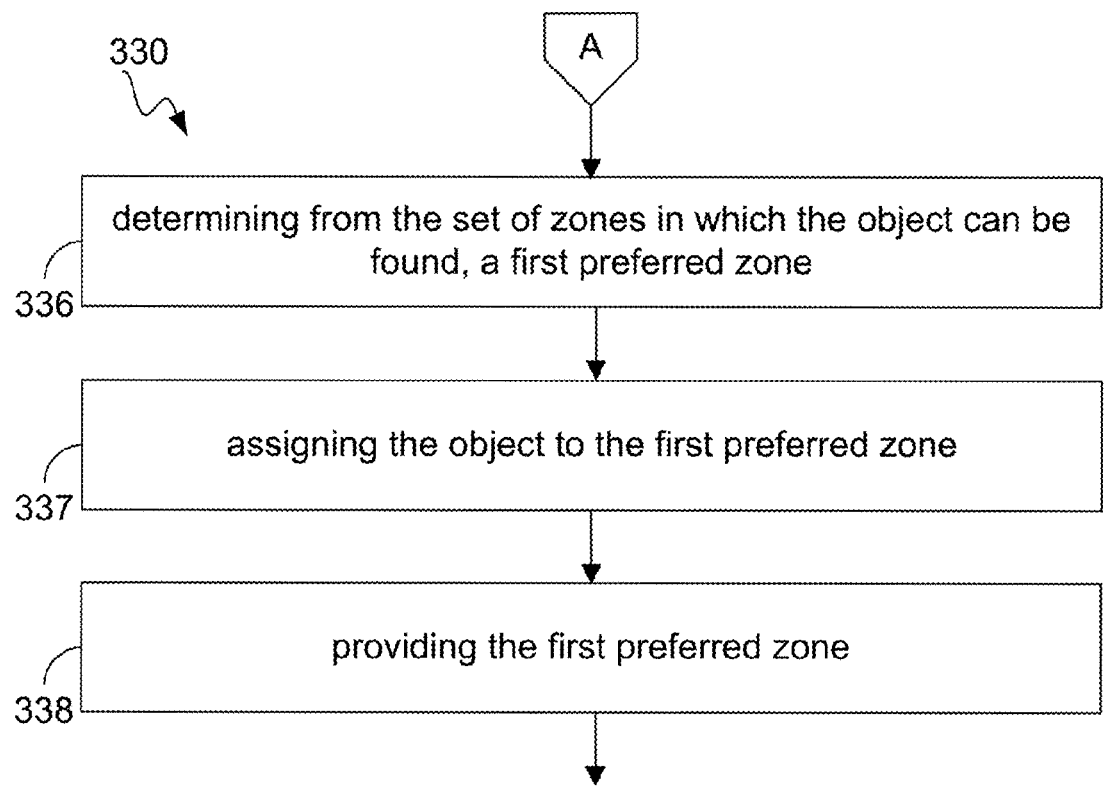

Alternatively, the object can be assigned to a preferred or default zone that can be selected from the set of zones built in action 334 employing processing such as illustrated in FIG. 3F. Now with reference to FIG. 3F, the flowchart 330 includes action 336 in which a first preferred zone is determined from the set of zones in which the object can be found. At action 337, the object is assigned to the first preferred zone. At action 338, the first preferred zone is provided to the invoking routine or system implementing object tracking.

Figure 3G:
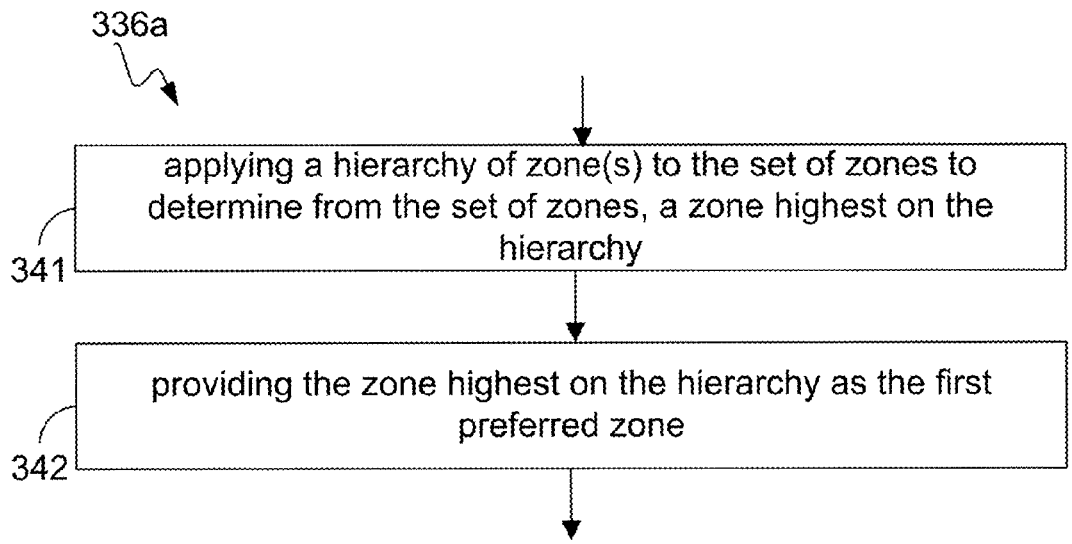

Preferred zone determination can be achieved by various algorithms and/or mechanisms. For example, the flow diagram 336a of FIG. 3G illustrates one method for determining a preferred zone for object(s). One implementation illustrated by FIG. 3G includes action 341, in which a hierarchy (or other ordering) of zone(s) is applied to the set of zones to determine therefrom a zone highest on the hierarchy. Hierarchies can match an implementation-specific criterion. For example, an implementation might prioritize zones as (command>content>modifier>hover), while an alternative implementation might prioritize zones as (content>command>modifier>hover). Further, other orderings, not necessarily hierarchical, can be used. In the action 342, a zone highest on the hierarchy is provided as the first preferred zone.

Figure 3H:
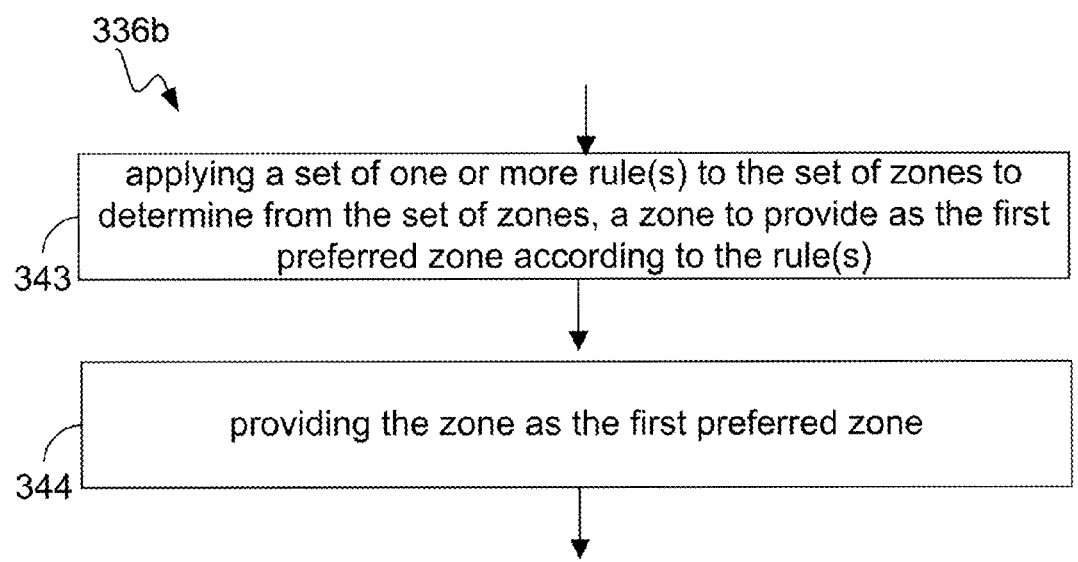

In an alternative implementation, rule-based algorithms and/or mechanisms can select the first preferred zone. For example, with reference to the flow diagram 336b shown in FIG. 3H, a method for determining a preferred zone for object(s) can begin with the action 343, in which a set of one or more rule(s) is applied to the set of zones to determine, from the set of zones, the first preferred zone according to the rule(s). At action 344, the zone is provided as the first preferred zone.

Figure 3I:
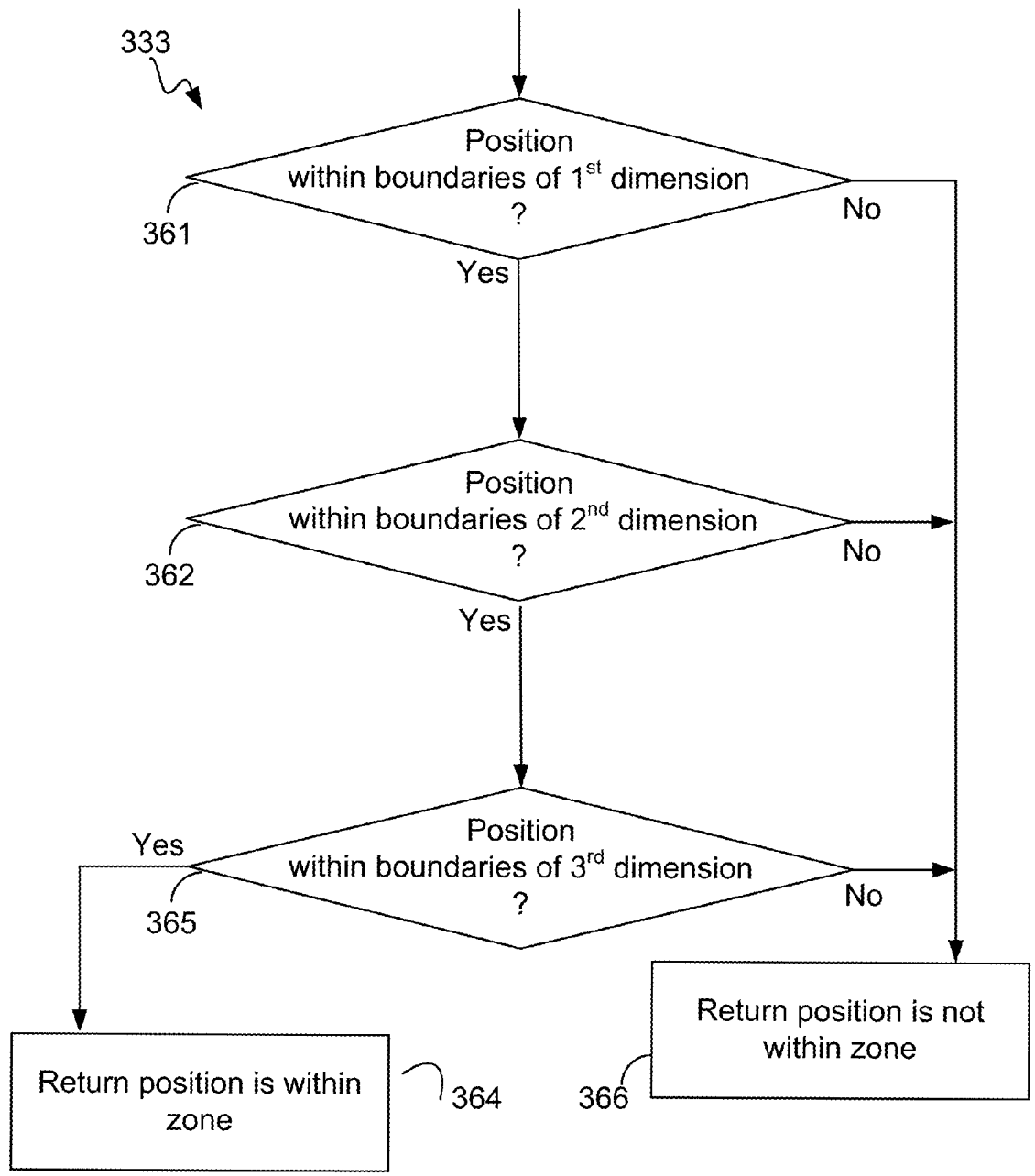

Zone presence determination can be achieved by various algorithms and/or mechanisms. For example, FIG. 3I illustrates a flow diagram 333 of one method for determining a zone for object(s). One implementation illustrated by FIG. 3I includes action 361, in which it is determined whether the position of an object is within the boundaries of a first dimension. Generally, an object having an x-coordinate x1 will be within the dimensional boundaries of the zone if $xmin \leq x1 \leq xmax$. If this does not hold true, then the object does not lie within the zone having x-dimensional boundaries of (xmin, xmax) and at action 366, "position is not within the zone" is returned. Otherwise, at action 362, it is determined whether the position of an object is within the boundaries of a second dimension, i.e., whether, for an object having a y-coordinate y1, $ymin \leq y1 \leq ymax$ holds true. If the position of the object is not determined to be within the boundaries of the second dimension, i.e., within (ymin, ymax), then control passes to action 366. Otherwise, in the action 365, it is determined whether the position of an object is within the boundaries of a third dimension, i.e., whether, for an object having a z-coordinate z1, $zmin \leq z1 \leq zmax$ holds true. If the position of the object is not determined to be within the boundaries of the third dimension, i.e., within (zmin, zmax), then the object is determined not to be within the zone (action 366). Otherwise, control passes to action 364, and "position is within the zone" is returned. Of course, the foregoing is merely an example, and implementations are not limited to the described order of dimension checking, nor for that matter limited to checking dimensions serially.

Figure 3J:
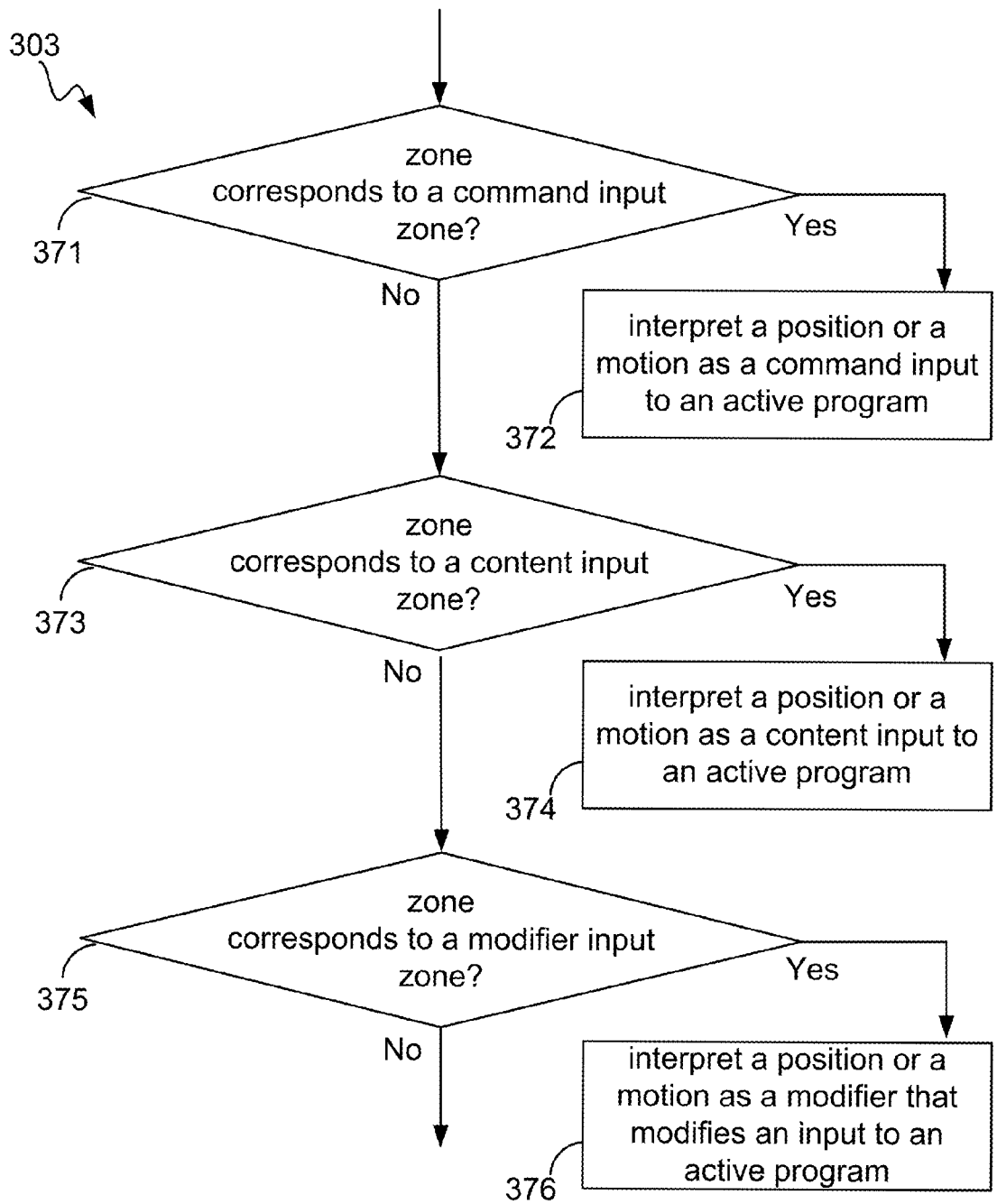

A correct way to interpret inputs made by a position or a motion of the portion of the hand or other detectable object can be determined from the zone (action 303). In an implementation and by way of example, FIG. 3J illustrates a flow diagram of one implementation for determining a correct interpretation from information about a zone in which a hand or other detectable object is detected. As shown in FIG. 3J, it is determined whether the zone corresponds to a command input zone (action 371). If so, the position or motion is interpreted as a command input to an active program (action 372). Otherwise, it is determined whether the zone corresponds to a content input zone (action 373). If so, then the position or motion is interpreted as a content input to an active program (action 374). Otherwise, it is determined whether the zone corresponds to a modifier input zone (action 375). If so, then the position or motion is interpreted as a modifying another input to an active program (action 376).

Figure 3K:
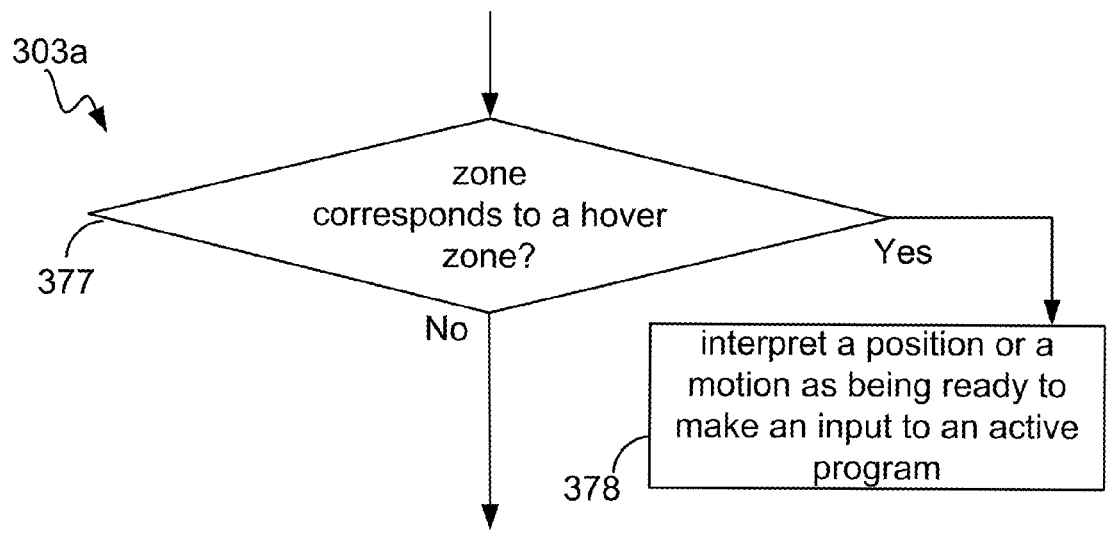

Alternatively, or in addition, in some implementations, with reference to FIG. 3K, it is determined whether the zone corresponds to a hover zone (action 377). If so, then the position or a motion is interpreted as being ready to make an input to an active program (action 378). A hover zone can be employed in conjunction with an interpretation of being ready to make a command input, a content input, and various combinations thereof.

The painting program example demonstrates the concept of command, content, modifier and hover zones. The user's finger position is interpreted as a command input when the physical location is in the Menu/Tool selection zone, and as content input when the physical location is in the canvas zone. After choosing the paint brush, a modifier zone makes it possible to choose a brush width for the brush. When the artist is not actively putting virtual paint on their virtual canvas they can hover above the virtual canvas, ready to add a brush stroke to the canvas Functional Models Implementing Features FIG. 4 illustrates various functional modules (e.g., "engines") implementing features and/or functionality provided by a representative zone-based interface system. As illustrated, the image analysis system 400 includes a variety of engines implementing functions supporting zone-based gesture interpretation and communication implementations. Imaging system initiation engine 402 provides for user initiation, system initiation and/or user authorization for system initiation. User-specific settings and parameters can be loaded (e.g., from a database) and made active responsive to detecting a specific user.

Imaging-system maintenance engine 403 provides for managing imaging device(s), light source(s), and so forth as described in the '485 application. Imaging device(s) can be calibrated and fields of view can be defined and/or determined, for example. Application(s)/OS integration maintenance engine 404 provides for managing interfacing between the image-analysis system, as described in the '485 application, and application(s) making use of gestural input and/or the operating system(s) (OS). User(s) and/or program(s) can add, delete and update device driver(s)

and/or definitions to match hardware components of the imaging system. A zone maintenance engine 406 provides for obtaining and maintaining parameters for zones, editing zone boundaries, editing rules for interpreting object(s) and/or motion(s) within zone(s). In variable-zone implementations, variable zone definition(s), parameter(s) can be selected and/or changed via the zone maintenance engine 406.

An interpretation rules maintenance engine 408 provides for obtaining, selecting, changing, and/or deleting rule(s) and/or parameter(s) governing zone-specific gesture interpretation (e.g., if the zone is a content-input zone, then gestures are interpreted as providing content; if the zone is a command zone, then gestures are interpreted as commands). A zone-object presence testing engine 410 provides for testing for the presence of object(s) and/or motion(s) within each zone. A gesture-interpretation engine 411 provides for interpreting object(s) and/or motion(s) as gesture(s). As explained in U.S. Ser. No. 61/752,725, filed Jan. 15, 2013, the entire disclosure of which is hereby incorporated by reference as if reproduced verbatim beginning here, the task of gesture interpretation can be performed by the imaging system, by an application utilizing gestural input, or by some combination depending on how computational resources are allocated. Accordingly, engine 411 can interpret gestures or perform some more limited form of processing, e.g., vectorizing a gesture for higher-level interpretation by an application. In environments where both the imaging system and a running application can interpret gestures, priority can be given to one system or the other based on, for example, a hierarchical priority level associated with particular gestures. For example, in one implementation, the imaging system can have priority for user-defined gestures while the application can have priority for application-defined gestures; accordingly, gesture interpretation can be system-dependent as specified by rules defined, for example, in a gesture interpretation rules-maintenance engine 412. A gesture settings/filtering engine 413 provides for maintaining settings useful in recognizing gestures. The various rules and parameters utilized by the engines described above can be maintained in one or more databases, in other implementations.

As explained above, zone-based object or gesture detection can be used, for example, to determine the proper interpretation of the user's movements. Another approach to gesture interpretation based on spatial position extends the touch-screen paradigm to free-space—that is, the user performs gestures in 3D space as if controlling a system using a touch screen, and systems and methods in accordance herewith respond as if a touch screen has been operated. This interface approach involves establishing the user's apparent perception of the (imagined) touch screen's location in space and her gestural intentions relative thereto, e.g., whether the user intends to pass a finger lightly over the screen surface, to press with more force against it, or to withdraw from the screen altogether to, for example, simply put her hand down without intending a gesture, to make a pinching or finger-spreading gesture, etc. This "virtual touch screen" approach can be used in conjunction with zones such that responsiveness and/or mapping of gestures to actions can be specific to each zone, or it can be implemented independently of zone-based sensing, in other implementations.

In one implementation, a spatial region can be monitored and a plane in the monitored space can be computationally defined. The user's movements are tracked relative to this spatially defined (virtual) plane, which can be defined implicitly or explicitly. In one implicit approach, the user moves his hands and/or fingers relative to an imagined plane that feels natural to him, as if attempting to manipulate a touch screen that controls a viewed display. The imaging system senses the user's movements and the gesture-interpretation engine 411 reconstructs, and computationally defines, the approximate location of the plane in 3D space based on the average depth of the user's gestures; gesture-interpretation engine 411 thereupon interprets the user's subsequent gestures relative to the defined plane. In one explicit approach, the system is trained to the user, who is prompted to, for example, "draw" a series of circles, lines and dots on an imagined plane. These gestures explicitly indicate the user's perception of the plane's location in 3D space.

The plane's location and orientation can be defined by Euclidean geometry in a 3D coordinate system associated with the monitored space; for example, the plane can be defined by a point and a normal vector, by a point and two vectors lying on the plane, etc. In some implementations, the plane is constrained to the use environment; for example, it can be assumed or required to be parallel to the display, or parallel to the display on one axis (e.g., the plane can tilt toward or away from the screen and/or rotate from side to side around a vertical axis). In other implementations, the plane is arbitrarily defined in space. Furthermore, the plane need not be a flat, two-dimensional construct; in some implementations, particularly for large virtual working surfaces, the plane can be curved in space to conform to a user's range of movements.

Since the user's attempts to draw on an imagined plane will conform only approximately to the plane as computationally defined, the plane can have a spatial thickness associated therewith. As a result, gestures (or the spatial average of gestures) occurring along spatial coordinates within the plane's defined thickness will be treated as gestures occurring on the plane. In certain implementations, the defined thickness is set and/or altered based on analysis of the user's movements—in effect, the plane is personalized to the user based on analysis of her gestures, which can occur on an ongoing basis. In the latter case, personalization is dynamic, i.e., revised as more user movements are detected. For example, the trajectories of user gestures can be characterized as arcs or vectors in 3D, and a maximum depth extent (i.e., gestural movement along the axis extending from the user to the display) used to define the thickness of the plane. Parameters specifying the plane's thickness can be associated with the particular user, e.g., stored in the user's record in a database of users. Indeed, these depth patterns can be uniquely enough associated with a given user as to be identifying; for example, the user can be asked to authenticate herself by signing her name in 3D space, and the "signature" pattern can be analyzed for authenticity in three dimensions against stored signature parameters.

The user can interact with the plane using his finger, hand, a held object, or other appendage. In some implementations, fingers are sensed and identified, and separate planes are defined for each finger. This affords a more 3D interactive experience, allowing the user to, for example, grip and manipulate a virtual joystick; alternatively or in addition, it can allow for more precise recognition of common 2D display-control gestures such as pinching (to zoom in), spreading (to zoom out), and rotation.

Systems and methods in accordance with the disclosed technology may not react until the user has reached or broken the virtual plane as spatially defined; that is, so long as the user's movements—i.e., movements of the user's hand, fingers or other object being tracked—occur closer to the user than the virtual plane (or, more typically, the closest surface of the 3D volume that defines the "plane"), they are not mapped to an action. When the user's gesture occurs on the plane, it can be mapped to any desired response on the display viewed by the user. For example, gesture-interpretation engine 411 can interpret the user's movements against the virtual plane to drive a rendering system that draws on the display the trajectories traced by the user in space. Gesture-interpretation engine 411 can map user gestures that penetrate the virtual plane to pressure—for example, causing the rendering system to draw a thicker line the more the user's movements take place beyond the plane (i.e., closer to the display), as if the user were pressing on a touch screen. Gesture-interpretation engine 411 can be further configured to adjust gesture-recognition sensitivity based on the speed of the user's movements.

The plane of interaction may not only vary in thickness depending on the user's movement patterns, but can shift in space as, for example, the user changes position (e.g., leans back) or simply due to changing user perceptions. Implementations of the disclosed technology can therefore cause the computationally defined plane to "follow" the user's gestures as if tethered to the gesturing appendage or object by a string—moving toward the user as the user's gestures retreat from a previous average location but interpreting gestural movements beyond this revised plane location as penetrative. In such implementations, the system can be configured such that only a large movement "through" the plane, or persistent gestures at a new location closer to the display, will be interpreted as an effort to move the plane back toward the display.

Figure 5A:
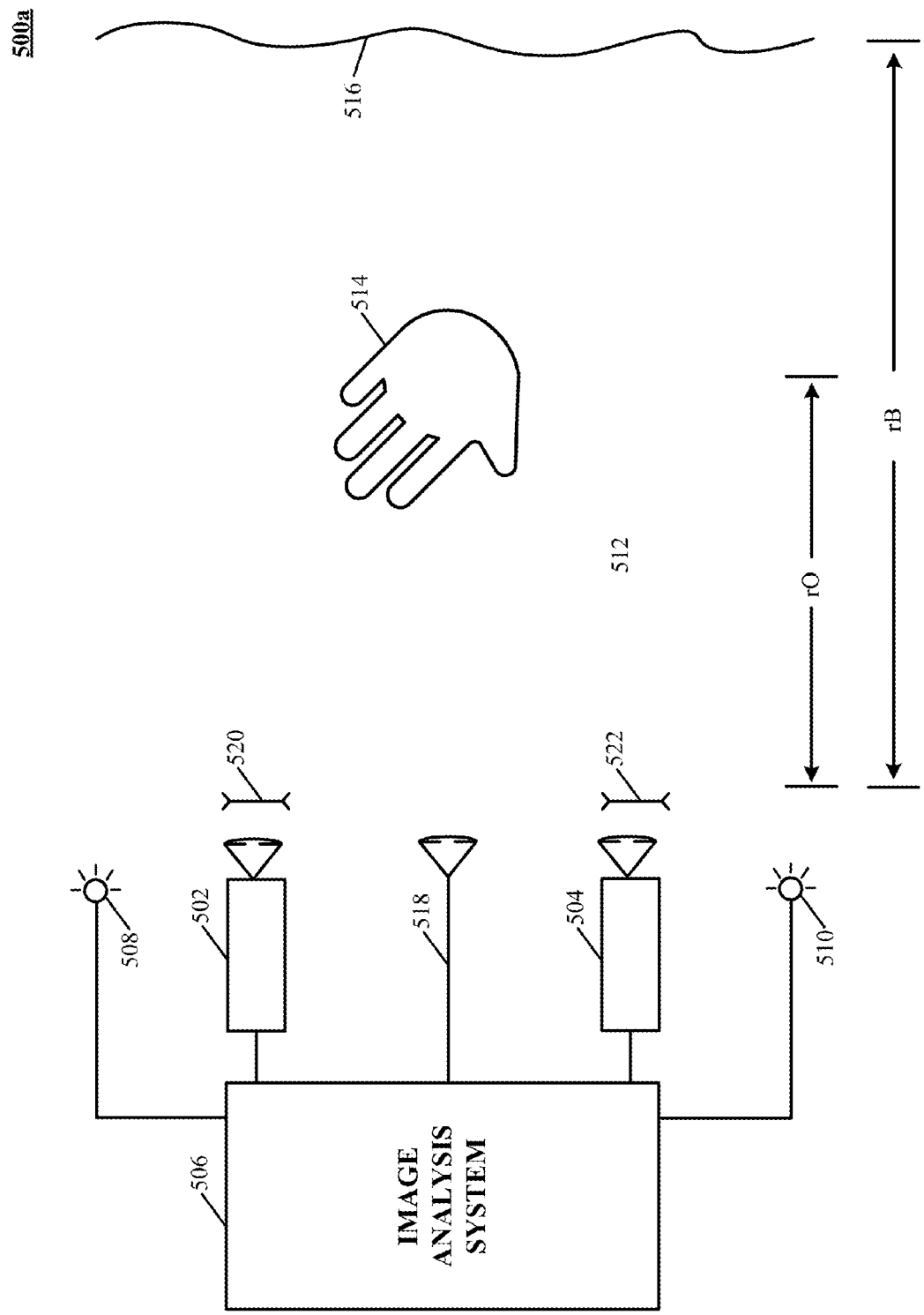
FIG. 5A illustrates a system for capturing image data according to an implementation of the technology disclosed.

Referring to FIG. 5A, which illustrates an exemplary gesture-recognition system 500A including any number of cameras 502, 504 coupled to an image-analysis system 506. Cameras 502, 504 can be any type of camera, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors or combinations thereof. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 502, 504 are preferably capable of capturing video images (i.e., successive image frames at a constant rate of at least 15 frames per second); although no particular frame rate is required. The capabilities of cameras 502, 504 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest can be defined as a cube approximately one meter on a side.

In some implementations, the illustrated system 500A includes one or more sources 508, 510, which can be disposed to either side of cameras 502, 504, and are controlled by image-analysis system 506. In one implementation, the sources 508, 510 are light sources. For example, the light sources can be infrared light sources, e.g., infrared light-emitting diodes (LEDs), and cameras 502, 504 can be sensitive to infrared light. Use of infrared light can allow the gesture-recognition system 500A to operate under a broad range of lighting conditions and can avoid various inconveniences or distractions that may be associated with directing visible light into the region where the person is moving. However, a particular wavelength or region of the electromagnetic spectrum can be required. In one implementation, filters 520, 522 are placed in front of cameras 502, 504 to filter out visible light so that only infrared light is registered in the images captured by cameras 502, 504. In another implementation, the sources 508, 510 are sonic sources providing sonic energy appropriate to one or more sonic sensors (not shown in FIG. 5A for clarity sake) used in conjunction with, or instead of, cameras 502, 504. The sonic sources transmit sound waves to the user; the user either blocks (or "sonic shadowing") or alters the sound waves (or "sonic deflections") that impinge upon her. Such sonic shadows and/or deflections can also be used to detect the user's gestures and/or provide presence information and/or distance information using ranging techniques known in the art. In some implementations, the sound waves are, for example, ultrasound, that is not audible to humans.

It should be stressed that the arrangement shown in FIG. 5A is representative and not limiting. For example, lasers or other light sources can be used instead of LEDs. In implementations that include laser(s), additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

In operation, light sources 508, 510 are arranged to illuminate a region of interest 512 that includes a control object portion 514 (in this example, a hand) that may optionally hold a tool or other object of interest and cameras 502, 504 are oriented toward the region 512 to capture video images of the hand 514. In some implementations, the operation of light sources 508, 510 and cameras 502, 504 is controlled by the image-analysis system 506, which can be, e.g., a computer system, control logic implemented in hardware and/or software or combinations thereof. Based on the captured images, image-analysis system 506 determines the position and/or motion of object 514.

Figure 5B:
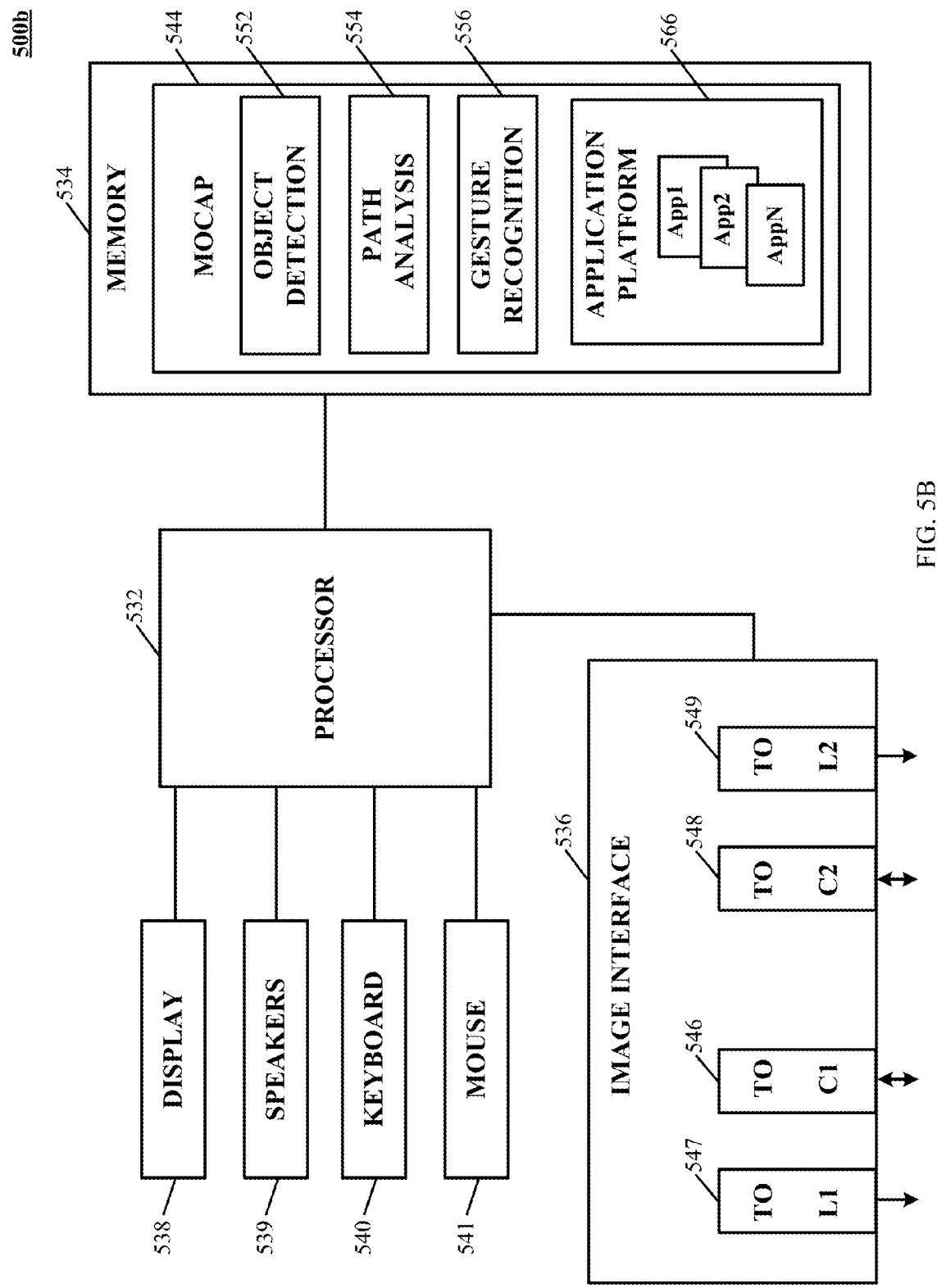
FIG. 5B is a simplified block diagram of a gesture-recognition system implementing an image analysis apparatus according to an implementation of the technology disclosed.

FIG. 5B is a simplified block diagram of a computer system 500B, implementing image-analysis system 506 (also referred to as an image analyzer) according to an implementation of the technology disclosed. Sensory-analysis system 506 can include or consist of any device or device component that is capable of capturing and processing image data. In some implementations, computer system 500B includes a processor 532, memory 534, an image interface 536, a display 538 (or other presentation mechanism(s), e.g. holographic projection systems, wearable googles or other head mounted displays (HMDs), heads up displays (HUDs), other visual presentation mechanisms or combinations thereof, speakers 539, a keyboard 540, and a mouse 541. Memory 534 can be used to store instructions to be executed by processor 532 as well as input and/or output data associated with execution of the instructions. In particular, memory 534 contains instructions, conceptually illustrated as a group of modules described in greater detail below, that control the operation of processor 532 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION operating system, iOS, Android or other mobile operating systems, or another operating system platform.

The computing environment can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 532 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Image interface 536 can include hardware and/or software that enables communication between computer system 500B and cameras such as cameras 502, 504 shown in FIG. 5A, as well as associated light sources such as light sources 508, 510 of FIG. 5A. Thus, for example, image interface 536 can include one or more data ports 546, 548 to which cameras can be connected, as well as hardware and/or software signal processors to modify data signals received from the cameras (e.g., to reduce noise or reformat data) prior to providing the signals as inputs to a motion-capture ("mocap") program 544 executing on processor 532. In some implementations, image interface 536 can also transmit signals to the cameras, e.g., to activate or deactivate the cameras, to control camera settings (frame rate, image quality, sensitivity, etc.), or the like. Such signals can be transmitted, e.g., in response to control signals from processor 132, which can in turn be generated in response to user input or other detected events.

Image interface 536 can also include controllers 547, 549, to which light sources (e.g., light sources 508, 510) can be connected. In some implementations, controllers 547, 549 provide operating current to the light sources, e.g., in response to instructions from processor 532 executing mocap program 544. In other implementations, the light sources can draw operating current from an external power supply, and controllers 547, 549 can generate control signals for the light sources, e.g., instructing the light sources to be turned on or off or changing the brightness. In some implementations, a single controller can be used to control multiple light sources.

Instructions defining mocap program 544 are stored in memory 534, and these instructions, when executed, perform motion-capture analysis on images supplied from cameras connected to image interface 536. In one implementation, mocap program 544 includes various modules, such as an object detection module 552, an object analysis module 554, and a gesture-recognition module 556. Object detection module 552 can analyze images (e.g., images captured via image interface 536) to detect edges of an object therein and/or other information about the object's location. Object analysis module 554 can analyze the object information provided by object detection module 552 to determine the 3D position and/or motion of the object (e.g., a user's hand). Examples of operations that can be implemented in code modules of mocap program 544 are described below. Memory 534 can also include other information and/or code modules used by mocap program 544 such as an application platform 566 that allows a user to interact with the mocap program 544 using different applications like application 1 (App1), application 2 (App2), and application N (AppN).

Display 538, speakers 539, keyboard 540, and mouse 541 can be used to facilitate user interaction with computer system 500B. In some implementations, results of gesture capture using image interface 536 and mocap program 544 can be interpreted as user input. For example, a user can perform hand gestures that are analyzed using mocap program 544, and the results of this analysis can be interpreted as an instruction to some other program executing on processor 532 (e.g., a web browser, word processor, or other application). Thus, by way of illustration, a user might use upward or downward swiping gestures to "scroll" a webpage currently displayed on display 538, to use rotating gestures to increase or decrease the volume of audio output from speakers 539, and so on.

It will be appreciated that computer system 500B is illustrative and that variations and modifications are possible. Computer systems can be implemented in a variety of form factors, including server systems, desktop systems, laptop systems, tablets, smart phones or personal digital assistants, wearable devices, e.g., goggles, head mounted displays (HMDs), wrist computers, and so on. A particular implementation can include other functionality not described herein, e.g., wired and/or wireless network interfaces, media playing and/or recording capability, etc. In some implementations, one or more cameras can be built into the computer or other device into which the sensor is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 500B is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

With reference to FIGS. 5A and 5B, the user performs a gesture that is captured by the cameras 502, 504 as a series of temporally sequential images. In other implementations, cameras 502, 504 can capture any observable pose or portion of a user. For instance, if a user walks into the field of view near the cameras 502, 504, cameras 502, 504 can capture not only the whole body of the user, but the positions of arms and legs relative to the person's core or trunk. These are analyzed by a gesture-recognition module 156, which can be implemented as another module of the mocap 544. Gesture-recognition module 556 provides input to an electronic device, allowing a user to remotely control the electronic device and/or manipulate virtual objects, such as prototypes/models, blocks, spheres, or other shapes, buttons, levers, or other controls, in a virtual environment displayed on display 538. The user can perform the gesture using any part of her body, such as a finger, a hand, or an arm. As part of gesture recognition or independently, the sensory-analysis system 506 can determine the shapes and positions of the user's hand in 3D space and in real time; see, e.g., U.S. Ser. Nos. 61/587,554, 13/414,485, 61/724,091, and 13/724,357 filed on Jan. 17, 2012, Mar. 7, 2012, Nov. 8, 2012, and Dec. 21, 2012 respectively, the entire disclosures of which are hereby incorporated by reference. As a result, the image-analysis system 506 can not only recognize gestures for purposes of providing input to the electronic device, but can also capture the position and shape of the user's hand in consecutive video images in order to characterize the hand gesture in 3D space and reproduce it on the display screen 538.

In one implementation, the gesture-recognition module 556 compares the detected gesture to a library of gestures electronically stored as records in a database, which is implemented in the image-analysis system 506, the electronic device, or on an external storage system. (As used herein, the term "electronically stored" includes storage in volatile or non-volatile storage, the latter including disks, Flash memory, etc., and extends to any computationally addressable storage media (including, for example, optical storage).) For example, gestures can be stored as vectors, i.e., mathematically specified spatial trajectories, and the gesture record can have a field specifying the relevant part of the user's body making the gesture; thus, similar trajectories executed by a user's hand and head can be stored in the database as different gestures so that an application can interpret them differently.

Particular Implementations

In one implementation, a method is described that processes an input, including detecting a portion of a hand or other detectable object (collectively "object" or "detectable object") in a 3D sensor space. This includes determining a zone from among multiple zones within the of 3D sensor space in which the portion of the detectable object was detected; and determining from the zone a correct way to interpret inputs detected by the 3D sensor as a position or a motion of the portion of the hand or other detectable object.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified as implementations in this section can readily be combined with sets of base features In some implementations, the method is enhanced by detecting the portion of a hand or other detectable object in the 3D sensor space and includes detecting at least one of a brush, a pen, a pencil, a stylus, a paintbrush, or an eraser.

This method can include determining the zone in which the portion of the hand or other detectable object was detected; capturing at least one image using an imaging analysis system, and analyzing the at least one captured image to detect at least one edge of the object based on changes in at least one parameter of the at least one image. It can further include determining a position and/or motion associated with the object based upon the at least one edge.

In some implementations, the method is enhanced by analyzing the parameter includes analyzing the at least one captured image for a change in pixel brightness.

The analyzing step can include comparing the brightness of at least two pixels to a threshold; and the process of detecting a transition in brightness from below the threshold to above the threshold across adjacent pixels.

The analyzing step can include comparing successive images captured without and with illumination by one or more light source; and detecting a transition in brightness from a low level to a high level across the successive images of individual pixels.

This method can be enhanced by determining from the zone in which the detectable object appears a correct way to interpret position or motion inputs. This feature can include interpreting a position or a motion as a command input when the detectable object is in a command input zone; interpreting a position or a motion as a content input when the detectable object is in a content input zone; interpreting a position or a motion as a modifier input modifying a concurrent input when the detectable object is in a modifier input zone; and/or interpreting a position or a motion as being ready to make an input when the detectable object is in a hover zone.

In some implementations, a method includes of interpreting motion of the hand or other detectable object as one or more gestures; and the process of determining from the one or more gestures an input to at least one of (i) an application or (ii) an operating system.

The method implementations described herein also can be practiced as a system or device with hardware running software capable of implementing the method and any combination of features. Example systems are further described below. Other implementations can include a non-transitory computer-readable storage medium storing instructions executable by a processor to perform any of the methods described above or that, when combined with suitable hardware, produce any of the systems devices described.

In article of manufacture implementations, computer programs incorporating various features of the disclosed technology can be encoded on various computer readable storage media; suitable media include magnetic disk or tape, optical storage media such as compact disk (CD) or DVD (digital versatile disk), flash memory, and any other non-transitory medium capable of holding data in a computer-readable form. Computer-readable storage media encoded with the program code can be packaged with a compatible device or provided separately from other devices. In addition program code can be encoded and transmitted via wired, optical, and/or wireless networks conforming to a variety of protocols, including the Internet, thereby allowing distribution, e.g., via Internet download and/or provided on-demand as web-services. In this application, computer-readable storage media are not meant to include transitory signals subject to the Federal Circuit rule of In re Nuijten.

In another implementation, a machine-implemented method is described that combines several features described above. This method processes an input, detecting a portion of a hand or other detectable object in a 3D sensor space. This method includes determining a zone corresponding to the 3D sensor space in which the portion of the hand or other detectable object was detected, by capturing an image using an imaging analysis system and analyzing the captured image to detect one or more edges of the object based on changes in at least one image parameter including brightness, by comparing the brightness of at least two pixels to a threshold; and detecting a transition in brightness from a low level to a high level across adjacent pixels.

This method implementation further includes determining a position and/or motion of the object based upon the one or more edges, by selecting a zone to test for presence of the object; determining whether the object is within the selected zone. The method includes adding the zone to a set of zones in which the object can be found when the object is determined to be within the selected zone.

This implementation further includes determining from the zone in which the detectable object appears a correct way to interpret position or motion inputs. This includes interpreting a position or a motion as a command input when the detectable object is in a command input zone; interpreting a position or a motion as a content input when the detectable object is in a content input zone; interpreting a position or a motion as a modifier input modifying a concurrent input when the detectable object is in a modifier input zone; and/or interpreting a position or a motion as being ready to make an input when the detectable object is in a hover zone.

This method can further include interpreting motion of the hand or other detectable object as one or more gestures can result in determining from the one or more gestures an input to at least one of (i) an application or (ii) an operating system.

In another implementation, a machine-implemented method for processing an input is described that combines many of the features separately described above. This method includes detecting a portion of a hand or other detectable object in a 3D sensor space. The method includes determining a zone corresponding to the 3D sensor space in which the portion of the hand or other detectable object was detected, by capturing an image using an imaging analysis system. The method includes analyzing the captured image to detect one or more edges of the object based on changes in at least one image parameter including brightness, by comparing the brightness of at least two pixels to a threshold and detecting a transition in brightness from a low level to a high level across adjacent pixels and determining position and/or motion of the object based upon the one or more edges. It includes selecting a zone to test for presence of the object, determining whether the object is within the selected zone, and adding the zone to a set of zones in which the object can be found when the object is determined to be within the selected zone.

This overall this method includes determining from the zone in which the detectable object appears a correct way to interpret position or motion inputs. This feature can include interpreting a position or a motion as a command input when the detectable object is in a command input zone; interpreting a position or a motion as a content input when the detectable object is in a content input zone; interpreting a position or a motion as a modifier input modifying a concurrent input when the detectable object is in a modifier input zone; and interpreting a position or a motion as being ready to make an input when the detectable object is in a hover zone.

In another implementation, a system is described that includes an image-capture device with at least one camera and an image analyzer coupled to the camera. The image analyzer detects a portion of a hand or other detectable object in a 3D sensor space, determines a zone corresponding to the 3D sensor space in which the portion of the hand or other detectable object was detected, and determines from the zone a correct way to interpret inputs made by a position or a motion of the portion of the hand or other detectable object.

The system implementation above can also be described as an imaging device. The imaging device includes an image-capture device including at least one camera and an interface to an image analyzer. The image analyzer detects a portion of a hand or other detectable object in a 3D sensor space and determines a zone from among multiple zones within the of 3D sensor space in which the portion of the hand or other detectable object was detected. The image analyzer determines from the zone a correct way to interpret inputs detected by the 3D sensor as a position or a motion of the portion of the hand or other detectable object.

These system and device implementations can further be enhanced by practicing any of the method features described above or in the claims.

Another implementation describes a machine-implemented method that processes position or gesture input, detecting a portion of a hand or other detectable object in a 3D sensor space. This method includes computationally defining a plane within the 3D sensor space and detecting interaction with the defined plane. The method includes detecting a gesture made by the hand or other detectable object, comparing a location of the gesture with a location of the defined plane, and based at least in part on the comparison, interpreting the gesture.

This implementation can be practiced with any of the features described above or in the claims and with any of the following features.

The gesture can be interpreted as a touch gesture if it occurs at a spatial location corresponding to or beyond a location of the defined plane.

The interpreted gesture can be mapped to an action on a display.

A gesture or portion thereof occurring beyond the location of the defined plane can be interpreted as a penetrative gesture.

Computationally defining the plane can include monitoring movements of the detected object to establish an average working surface.

The plane can be flat. The so-called plane can be curved or it can have a thickness.

The can further include adjusting the location of the plane based on movements of the detected object or interactions between the detected object and virtual objects.

This additional method can be implemented as a system, device, or computer-readable storage media, as described above.

Thus, although the disclosed technology has been described with respect to specific implementations, it will be appreciated that the disclosed technology is intended to cover all modifications and equivalents within the scope of the following claims. The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A machine-implemented method for processing an input gesture, the method comprising:
   tracking using a 3D sensor user movements including sensing positional information of a portion of a hand in a monitored region of space monitored by the 3D sensor;
   using the sensed positional information of the portion of the hand, defining a plurality of distinct user-specific virtual planes, including at least a first user-specific virtual plane defined in space relative to a position of, and corresponding to, a first finger of the hand and a second user-specific virtual plane defined in space relative to a position of, and corresponding to, a second finger of the hand, in the monitored region of space;
   detecting, by the 3D sensor, a first finger state of the first finger relative to the corresponding first user-specific virtual plane and a second finger state of the second finger relative to the corresponding second user-specific virtual plane, wherein a finger state for a finger relative to the corresponding user-specific virtual plane defined for the finger is one of: the finger moving closer or further away from the corresponding user-specific virtual plane, and the finger moving on or against the corresponding user-specific virtual plane;
   determining an input gesture made by the portion of the hand based on the first finger state and the second finger state;
   using the sensed positional information of the hand, determining from a plurality of zones defined for the monitored region, a zone in which the portion of the hand is present at the time the first finger state and the second finger state are detected;
   interpreting the input gesture as a command using the input gesture and the zone determined from the position of the hand; and
   providing the command to a machine for executing an action appropriate to the command.

2. The machine-implemented method of claim 1, further comprising:
   determining the input gesture to be a pinch gesture and interpreting the pinch gesture to be a command indicating a zoom-in command, the determining and interpreting including:
      determining that the first finger state and the second finger state indicate that the first finger and the second finger changed distance from their corresponding user-specific virtual planes;
      determining that the first finger and second finger penetrating their corresponding user-specific virtual planes; and
      determining that the hand portion was present in a zone specific to entering commands.

3. The machine-implemented method of claim 1, further comprising:
   determining the input gesture to be a spreading gesture and interpreting spreading gesture to be a command indicating a zoom-out command, the determining and interpreting including:
      determining that the first finger state and the second finger state indicate that the first finger and the second finger changed distance from their corresponding user-specific virtual planes;
      determining that the first finger and second finger receded from their corresponding user-specific virtual planes; and
      determining that the hand portion was present in a zone specific to entering commands.

4. The machine-implemented method of claim 1, further comprising:
   determining the input gesture to be a pressure gesture and interpreting the pressure gesture to be a command indicating a command to draw a thicker line on a display, the determining and interpreting including:
      determining that the first finger state and the second finger state indicate that the first finger and the second finger changed distance from their corresponding user-specific virtual planes;
      determining that the first finger and second finger penetrated their corresponding user-specific virtual planes; and
      determining that the hand portion was present in a zone specific to entering content.

5. The method of claim 1, further comprising:
   determining the command to indicate movement of a displayed object on a display responsive to:
      determining that at least one of the first finger state and the second finger state indicates that the corresponding finger moved along a surface of the corresponding user-specific virtual plane; and
      determining that the hand portion was in a zone specific to entering content.

6. The machine-implemented method of claim 1, further comprising:
   determining from the sensed user movement a speed of the portion of the hand and adjusting gesture-recognition sensitivity based on the speed of the user movement.

7. The machine-implemented method of claim 1, further comprising:
   dynamically personalizing one or more planes by characterizing trajectories of user gestures as vectors in 3-dimensional space, using the vectors to determine a maximal depth extent from gestural movement along an axis extending from the user to a display; and defining a thickness of a plane based upon the maximal depth.

8. The machine-implemented method of claim 7, further comprising:
   revising plane positions as more user movements are detected.

9. The machine-implemented method of claim 1 further comprising:
   shifting a plane in space as the user changes position.

10. The machine-implemented method of claim 1,
   wherein the portion of the hand or other detectable object can be found in more than one zone, the more than one zone comprising a set of zones, and
   wherein the method further includes:
      determining from the set of zones in which the portion of the hand or other detectable object can be found, a first preferred zone;
      assigning the portion of the hand or other detectable object to the first preferred zone; and
      reporting the first preferred zone for further processing;
   wherein the determining the first preferred zone includes:

applying a set of one or more rules to the set of zones to determine, from the set of zones, the first preferred zone according to the one or more applied rules; and
reporting the first preferred zone for further processing.

11. The machine-implemented method of claim 10, wherein determining the first preferred zone includes:
applying a zone hierarchy to the set of zones to determine, from the set of zones, a zone highest on the zone hierarchy; and
reporting the zone highest on the zone hierarchy as the first preferred zone for further processing.

12. The machine-implemented method of claim 1, wherein determining the correct way to interpret the input detected by the 3D sensor includes:
determining an active program and that the determined zone is a hover zone for the active program; and
interpreting a position or a motion of the portion of the hand or other detectable object based on the active program and the hover zone.

13. The machine-implemented method of claim 1, further comprising:
interpreting a motion of the portion of the hand or other detectable object as one or more gestures; and
determining from the one or more gestures an input to at least one of (i) an application and (ii) an operating system.

14. A system, including:
an image-capture device including at least one camera;
an image analyzer coupled to the at least one camera, the image analyzer being configured to:
track using a 3D sensor user movements including sensing positional information of a portion of a hand in a monitored region of space monitored by the 3D sensor;
using the sensed positional information of the portion of the hand, define a plurality of distinct user-specific virtual planes, including at least a first user-specific virtual plane defined in space relative to a position of, and corresponding to, a first finger of the hand and a second user-specific virtual plane defined in space relative to a position of, and corresponding to, a second finger of the hand, in the monitored region of space;
detect a first finger state of the first finger relative to the corresponding first user-specific virtual plane and a second finger state of the second finger relative to the corresponding second user-specific virtual plane, wherein a finger state for a finger relative to the corresponding user-specific virtual plane defined for the finger is one of: the finger moving closer or further away from the corresponding user-specific virtual plane, and the finger moving on or against the corresponding user-specific virtual plane;
determine an input gesture made by the portion of the hand based on the first finger state and the second finger state;
using the sensed positional information of the hand, determine from a plurality of zones defined for the monitored region, a zone in which the portion of the hand is present at the time the first finger state and the second finger state are detected;
interpret the input gesture as a command using the input gesture and the zone determined from the position of the hand; and
provide the command to a machine for executing an action appropriate to the command.

15. The system of claim 14, wherein the image analyzer is further configured to:
determine the input gesture to be a pinch gesture and interpreting the pinch gesture to be a command indicating a zoom-in command, the determining and interpreting including:
determining that the first finger state and the second finger state indicate that the first finger and the second finger changed distance from their corresponding user-specific virtual planes;
determining that the first finger and second finger penetrating their corresponding user-specific virtual planes; and
determining that the hand portion was present in a zone specific to entering commands.

16. The system of claim 14, wherein the image analyzer is further configured to:
determine the input gesture to be a spreading gesture and interpreting spreading gesture to be a command indicating a zoom-out command, the determining and interpreting including:
determining that the first finger state and the second finger state indicate that the first finger and the second finger changed distance from their corresponding user-specific virtual planes;
determining that the first finger and second finger receded from their corresponding user-specific virtual planes; and
determining that the hand portion was present in a zone specific to entering commands.

17. The system of claim 14, wherein the image analyzer is further configured to:
determine the input gesture to be a pressure gesture and interpreting the pressure gesture to be a command indicating a command to draw a thicker line on a display, the determining and interpreting including:
determining that the first finger state and the second finger state indicate that the first finger and the second finger changed distance from their corresponding user-specific virtual planes;
determining that the first finger and second finger penetrated their corresponding user-specific virtual planes; and
determining that the hand portion was present in a zone specific to entering content.

18. The system of claim 14, wherein the image analyzer is further configured to:
determine the command to indicate movement of a displayed object on a display responsive to:
determining that at least one of the first finger state and the second finger state indicates that the corresponding finger moved along a surface of the corresponding user-specific virtual plane; and
determining that the hand portion was in a zone specific to entering content.

19. The system of claim 18, wherein the image analyzer is further configured to:
detect that a finger of the first finger or the second finger penetrated the corresponding user-specific virtual plane preceding detection that the finger state associated with the finger detected motion along the surface of corresponding user-specific virtual plane, and
determine the command to indicate dragging of the displayed object across the display.

20. A non-transitory computer-readable storage medium storing instructions which when executed by a processor cause the processor to:

track using a 3D sensor user movements including sensing positional information of a portion of a hand in a monitored region of space monitored by the 3D sensor;

using the sensed positional information of the portion of the hand, define a plurality of distinct user-specific virtual planes, including at least a first user-specific virtual plane defined in space relative to a position of, and corresponding to, a first finger of the hand and a second user-specific virtual plane defined in space relative to a position of, and corresponding to, a second finger of the hand, in the monitored region of space;

detect, by the 3D sensor, a first finger state of the first finger relative to the corresponding first user-specific virtual plane and a second finger state of the second finger relative to the corresponding second user-specific virtual plane, wherein a finger state for a finger relative to the corresponding user-specific virtual plane defined for the finger is one of: the finger moving closer or further away from the corresponding user-specific virtual plane, and the finger moving on or against the corresponding user-specific virtual plane;

determine an input gesture made by the portion of the hand based on the first finger state and the second finger state;

using the sensed positional information of the hand, determine from a plurality of zones defined for the monitored region, a zone in which the portion of the hand is present at the time the first finger state and the second finger state are detected;

interpret the input gesture as a command using the input gesture and the zone determined from the position of the hand; and provide the command to a machine for executing an action appropriate to the command.

* * * * *